United States Patent
Hirota et al.

(10) Patent No.: US 6,867,830 B1
(45) Date of Patent: Mar. 15, 2005

(54) REFLECTION-TYPE COLOR LIQUID CRYSTAL DISPLAY APPARATUS

(75) Inventors: Shoichi Hirota, Hitachi (JP); Osamu Ito, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 90 days.

(21) Appl. No.: 09/624,062

(22) Filed: Jul. 24, 2000

(30) Foreign Application Priority Data

Jul. 26, 1999 (JP) .......................................... 11-210659

(51) Int. Cl.⁷ .......................................... G02F 1/1335
(52) U.S. Cl. ...................................................... 349/96
(58) Field of Search ............................ 349/33, 42, 96, 349/67, 76

(56) References Cited

U.S. PATENT DOCUMENTS

| | | | | |
|---|---|---|---|---|
| 5,485,295 A | * | 1/1996 | Itoh et al. ................... | 349/117 |
| 5,841,496 A | * | 11/1998 | Itoh et al. ................... | 349/113 |
| 6,133,894 A | * | 10/2000 | Yagyu ......................... | 345/87 |
| 6,433,845 B1 | * | 8/2002 | Suzuki et al. ............... | 349/102 |

FOREIGN PATENT DOCUMENTS

| | | |
|---|---|---|
| JP | 6-11711 | 1/1994 |
| JP | 10-154817 | 6/1998 |

OTHER PUBLICATIONS

M. Shibazaki, et al., Reflective LCD with High Brightness and Wide Viewing Angle by Using Optically Compensated Twist-LC Cell (OCT), SID 99 Digest, pp. 690–693.

* cited by examiner

Primary Examiner—Tarifur R. Chowdhury
Assistant Examiner—P. R. Akkapeddi
(74) Attorney, Agent, or Firm—Hogan & Hartson, LLP

(57) ABSTRACT

A reflection type color liquid crystal display (LCD) device is disclosed that achieves achromatization in black and white as well intermediate scale display. The LCD device includes an active matrix substrate provided with a plurality of pixels each having a switching element and a reflection electrode in a matrix configuration, a liquid crystal layer between the substrate and a glass substrate, a phase plate and a polarization plate. The parameters of the above elements are designed such that projections of Stokes parameter ($S_1$, $S_2$, $S_3$) of light between the phase plate and the liquid crystal layer on an $S_1$–$S_2$ plane constitute a substantially linear line, and that at a reflecting plane of the reflection electrode, the polarization of the light is substantially circularly polarized for a normally black display and substantially linearly polarized for a normally white display over a wide wavelength range.

8 Claims, 20 Drawing Sheets

50° TWIST

F I G. 14
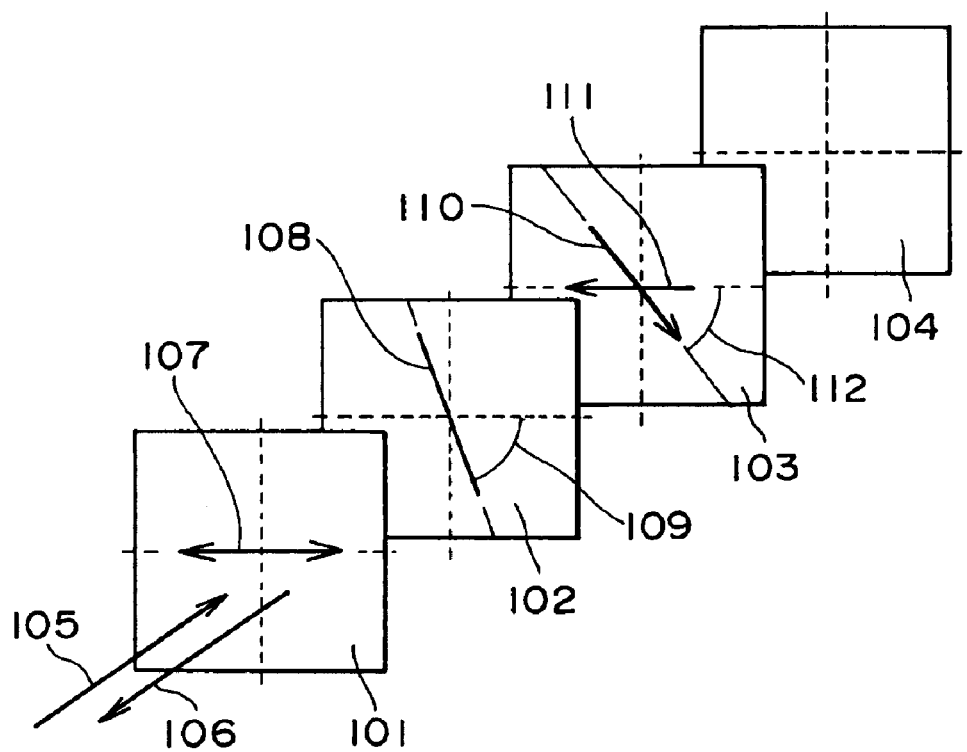

FIG. 27

| RETARDATION OF LIQUID CRYSTAL LAYER [nm] | TWIST ANGLE [degree] | LIQUID CRYSTAL ORIENTATION ANGLE [degree] | PHASE PLATE AZIMUTH ANGLE [degree] | PHASE PLATE RETARDATION [nm] | CONTRAST RATIO |
|---|---|---|---|---|---|
| 200 | 40 | -22 | 71 | 334 | 374 |
| 200 | 45 | -19 | 74 | 332 | 794 |
| 200 | 50 | -17 | 77 | 328 | 559 |
| 200 | 55 | -16 | 80 | 320 | 205 |
| 250 | 40 | -29 | 70 | 385 | 297 |
| 250 | 45 | -27 | 73 | 383 | 527 |
| 250 | 50 | -26 | 76 | 379 | 462 |
| 250 | 55 | -24 | 78 | 370 | 244 |
| 275 | 40 | -31 | 70 | 409 | 330 |
| 275 | 45 | -29 | 73 | 406 | 413 |
| 275 | 50 | -28 | 76 | 401 | 241 |
| 275 | 55 | -28 | 81 | 410 | 65 |
| 300 | 40 | -32 | 71 | 433 | 316 |
| 300 | 45 | -31 | 75 | 430 | 222 |
| 300 | 50 | -30 | 78 | 423 | 106 |
| 310 | 40 | -32 | 72 | 445 | 262 |
| 310 | 45 | -31 | 75 | 441 | 163 |
| 310 | 50 | -30 | 79 | 434 | 79 |
| 320 | 40 | -32 | 72 | 458 | 194 |
| 320 | 45 | -31 | 76 | 456 | 122 |
| 320 | 50 | -30 | 80 | 450 | 62 |
| 330 | 40 | -32 | 72 | 476 | 116 |
| 330 | 45 | -31 | 76 | 477 | 88 |
| 330 | 50 | -30 | 80 | 477 | 52 |

FIG. 28

| RETARDATION OF LIQUID CRYSTAL LAYER [nm] | TWIST ANGLE [degree] | PHASE PLATE AZIMUTH ANGLE [degree] | PHASE PLATE RETARDATION [nm] | CONTRAST RATIO |
|---|---|---|---|---|
| 200 | 50 | 52 | 154 | 6 |
| 200 | 55 | 50 | 144 | 9 |
| 200 | 60 | 48 | 137 | 13 |
| 200 | 65 | 44 | 133 | 15 |
| 250 | 50 | 58 | 140 | 14 |
| 250 | 55 | 55 | 122 | 35 |
| 250 | 60 | 51 | 108 | 41 |
| 250 | 65 | 46 | 101 | 21 |
| 300 | 50 | 65 | 145 | 25 |
| 300 | 55 | 63 | 118 | 60 |
| 300 | 60 | 59 | 91 | 23 |
| 300 | 65 | 50 | 73 | 10 |
| 350 | 50 | 70 | 173 | 29 |
| 350 | 55 | 71 | 146 | 113 |
| 350 | 60 | 70 | 109 | 22 |
| 350 | 65 | 66 | 70 | 5 |
| 400 | 50 | 71 | 216 | 20 |
| 400 | 55 | 73 | 196 | 67 |
| 400 | 60 | 74 | 162 | 185 |
| 400 | 65 | 75 | 110 | 10 |
| 450 | 50 | 70 | 255 | 19 |
| 450 | 55 | 72 | 250 | 35 |
| 450 | 60 | 74 | 242 | 49 |
| 450 | 65 | 75 | 220 | 66 |

REFLECTION-TYPE COLOR LIQUID CRYSTAL DISPLAY APPARATUS

BACKGROUND OF THE INVENTION

The present invention relates to a reflection-type color liquid crystal display apparatus. In particular, the present invention relates to a technique for liquid crystal display capable of realizing color reproduction at all of gray scales.

A reflection type liquid crystal display is a display having a feature of low power consumption inherent to liquid crystal. Further, the reflection type liquid crystal display Is a device indispensable for apparatuses that are intensive in demand for drive time such as a portable information terminal device or the like. However, according to a reflection type liquid crystal display of black and white display currently constituting the main stream, there poses a problem in which an amount of information which can be displayed thereby is limited, and further it is difficult to deal with image information thereby. A reflection type color liquid crystal display having a high performance is desired for expanding markets of a portable information terminal device or the like in the future.

In Japanese Patent Laid-Open No. Hei 10-154817, there is disclosed a cell parameter in the case of twist angles of 45°, 63° and 90°. Further, in Japanese Patent Laid-Open No. Hei 6-11711, there is disclosed a reflection type liquid crystal display apparatus having a mirror surface electrode having irregularities surfaces of which are smooth and comprising a polarizer, a liquid crystal element and an optical phase compensating member. According to the reflection type crystal display apparatus, retardations of the crystal element and the optical phase compensating member are selected such that a light transmitting state is constituted when an amount obtained by dividing a difference between retardation of the liquid crystal element and retardation of the optical phase compensating member by wavelength, is m/2±0.1 where m is a positive integer and a light blocking state is constituted when the amount is 0.25±m/2±0.1.

In either of the above-described conventional techniques, although some achromatization in white or black display is taken into consideration to some degree, achromatization in white display as well as black display and over all of gray scales is not taken into consideration. Therefore, when gradation display continuously changing from white to black is carried out in a liquid crystal display under such a condition, coloring is caused at an intermediary gray scale, resulting in a deterioration in display quality.

SUMMARY OF THE INVENTION

It is an object of the present invention to provide a reflection-type color liquid crystal display apparatus realizing achromatization in white displaying and black displaying and in addition thereto, achromatization in an intermediate gray scale display and having a high color reproducibility.

In order to achieve the object, according to an aspect of the present invention, there is provided a reflection-type color liquid crystal display apparatus comprising an active matrix substrate provided with a plurality of pixels each having a switching element and a reflection electrode in a matrix shape, a glass substrate having a transparent electrode, a liquid crystal layer arranged between the active matrix substrate and the glass substrate, a phase plate and a polarizing plate, wherein for a normally black display system for displaying a black image on a lower voltage side of a voltage applied to the liquid crystal layer and displaying a white image at a certain voltage on a high voltage side, projections of Stokes parameter ($S_1$, $S_2$, $S_3$) of light between the phase plate and the liquid crystal layer on an $S_1$–$S_2$ plane constitute a substantially linear line and polarized light at a reflecting plane of the reflection electrode is substantially circularly polarized light in any of wavelengths.

According to an embodiment of the present invention, there is realized the reflection-type color liquid crystal display apparatus having a preferable high contrast ratio, wherein retardation of the liquid crystal layer which is a product of a thickness and refractive index anisotropy of the liquid crystal layer falls in a range equal to or larger than 150 nm and equal to or smaller than 340 nm and a twist angle of the liquid crystal layer falls in a range equal to or larger than 20 degrees and equal to or smaller than 70 degrees.

According to an embodiment of the present invention, there is realized the reflection-type color liquid crystal display apparatus having a higher contrast ratio, wherein retardation of the liquid crystal layer which is a product of a thickness and refractive index anisotropy of the liquid crystal layer falls in a range equal to or larger than 200 nm and equal to or smaller than 300 nm, a twist angle of the liquid crystal layer falls in a range equal to or larger than 40 degrees and equal to or smaller than 55 degrees, an angle made by a transmission axis of the polarizing plate and a liquid crystal orientation direction on a side of the glass substrate falls in a range equal to or larger than −32 degrees and equal to or smaller than −16 degrees, an azimuth angle of the phase plate which is an angle made by the transmission axis of the polarizing plate and a retarded phase axis of the phase plate falls in a range equal to or larger than 70 degrees and equal to or smaller than 81 degrees, and retardation of the phase plate falls in a range equal to or larger than 320 nm and equal to or smaller than 430 nm.

According to an embodiment of the present invention, there is realized the reflection-type color liquid crystal display apparatus capable of executing achromatic display at all of gray scales and good in color reproducibility, wherein retardation of the liquid crystal layer which is a product of a thickness and refractive index anisotropy of the liquid crystal layer is substantially 250 nm, a twist angle of the liquid crystal layer is substantially 50 degrees, an angle made by a transmission axis of the polarizing plate and a liquid crystal orientation direction on a side of the glass substrate is substantially −26 degrees, an azimuth angle of the phase plate which is an angle made by the transmission axis of the polarizing plate and a retarded phase axis of the phase plate is substantially 76 degrees, and retardation of the phase plate is substantially 380 nm.

Further, according to another aspect of the present invention, there is provided a reflection-type color liquid crystal display apparatus comprising an active matrix substrate provided with a plurality of pixels each having a switching element and a reflection electrode in a matrix shape, a glass substrate having a transparent electrode, a liquid crystal layer filled between the active matrix substrate and the glass substrate, a phase plate and a polarizing plate, wherein for a normally white display system for displaying a white image on a lower voltage side of a voltage applied to the liquid crystal layer and displaying a black image at a certain voltage on a high voltage side, projections of Stokes parameter ($S_1$, $S_2$, $S_3$) of light between the phase plate and the liquid crystal layer on an $S_1$–$S_2$ plane constitute a substantially linear line and polarized light at a reflecting plane of the reflection electrode is substantially linearly polarized light in any of wavelengths.

According to an embodiment of the present invention, there is realized the reflection-type color liquid crystal display apparatus having a preferable high contrast ratio, wherein retardation of the liquid crystal layer which is a product of a thickness and refractive index anisotropy of the liquid crystal layer falls in a range equal to or larger than 200 nm and equal to or smaller than 450 nm, a twist angle of the liquid crystal layer falls in a range equal to or larger than 50 degrees and equal to or smaller than 65 degrees, an angle made by a transmission axis of the polarizing plate and a liquid crystal orientation direction on a side of the active matrix substrate is substantially 0 degree or 90 degrees, an azimuth angle of the phase plate which is an angle made by the liquid crystal orientation direction on the side of the active matrix substrate and a retarded phase axis of the phase plate falls in a range equal to or larger than 44 degrees and equal to or smaller than 76 degrees, and retardation of the phase plate falls in a range equal to or larger than 69 nm and equal to or smaller than 255 nm.

According to another aspect of the present invention, there is realized a reflection-type color liquid crystal display apparatus having a higher contrast ratio, wherein retardation of the liquid crystal layer which is a product of a thickness and refractive index anisotropy of the liquid crystal layer falls in a range equal to or larger than 250 nm and equal to or smaller than 450 nm, a twist angle of the liquid crystal layer falls in a range equal to or larger than 55 degrees and equal to or smaller than 60 degrees, an angle made by a transmission axis of the polarizing plate and a liquid crystal orientation direction on a side of the active matrix substrate is substantially 0 degree or 90 degrees, an azimuth angle of the phase plate which is an angle made by the liquid crystal orientation direction on the side of the active matrix substrate and a retarded phase axis of the phase plate falls in a range equal to or larger than 47 degrees and equal to or smaller than 75 degrees, and retardation of the phase plate falls in a range equal to or larger than 91 nm and equal to or smaller than 251 nm.

According to an embodiment of the present invention, there is provided a reflection-type color liquid crystal display apparatus capable of executing achromatic display at all of gray scales and good in color reproducibility, wherein retardation of the liquid crystal layer which is a product of a thickness and refractive index anisotropy of the liquid crystal layer is substantially 400 nm, a twist angle of the liquid crystal layer falls in a range equal to or larger than about 55 degrees and equal to or smaller than about 60 degrees, an angle made by a transmission axis of the polarizing plate and a liquid crystal orientation direction on a side of the active matrix substrate is substantially 0 degree or 90 degrees, an azimuth angle of the phase plate which is an angle made by the liquid crystal orientation direction on the side of the active matrix substrate and a retarded phase axis of the phase plate falls in a range equal to or larger than about 73 degrees and equal to or smaller than about 74 degrees, and retardation of the phase plate falls in a range equal to or larger than about 160 nm and equal to or smaller than about 200 nm.

Further, according to another aspect of the present invention, there is provided a reflection-type color liquid crystal display apparatus comprising an active matrix substrate provided with a plurality of pixels each having a switching element and a reflection electrode in a matrix shape, a glass substrate having a transparent electrode, a liquid crystal layer filled between the active matrix substrate and the glass substrate, a phase plate and a polarizing plate, wherein for a normally white display system for displaying a black image on a lower voltage side of a voltage applied to the liquid crystal layer and displaying a white image at a certain voltage on a high voltage side, retardation of a liquid crystal layer which is a product of a thickness and refractive index anisotropy of the liquid crystal layer falls in a range equal to or larger than 200 nm and equal to or smaller than 450 nm, a twist angle of the liquid crystal layer falls in a range equal to or larger than 50 degrees and equal to or smaller than 65 degrees, an angle made by a transmission axis of the polarizing plate and a liquid crystal orientation direction on a side of the active matrix substrate is substantially 0 degree or 90 degrees, an azimuth angle of the phase plate which is an angle made by the liquid crystal orientation direction on the side of the active matrix substrate and a retarded phase axis of the phase plate falls in a range equal to or larger than 44 degrees and equal to or smaller than 76 degrees, and retardation of the phase plate falls in a range equal to or larger than 69 nm and equal to or smaller than 255 nm.

According to an embodiment of the present invention, there is provided the reflection-type color liquid crystal display apparatus, further comprising a light source irradiating the reflection-type color liquid crystal display apparatus with three prime colors by switching the three prime colors on a time division basis to thereby display images in correspondence with the respective three prime colors in synchronism with switching timing of the light source on the time division basis.

BRIEF DESCRIPTION OF THE DRAWINGS

FIG. 14 is a schematic view of a second embodiment of the present invention, showing an explanatory view with regard to parameters for determining a relative relationship of optical axes in respective optical elements constituting a reflection-type color liquid crystal display apparatus and optical characteristics;

FIG. 27 is a view of Table 1; and

FIG. 28 is a view of Table 2.

DETAILED DESCRIPTION OF THE PREFERRED EMBODIMENTS

An explanation will be given of embodiments of the present invention with reference to the drawings as follows.

Figure 2:
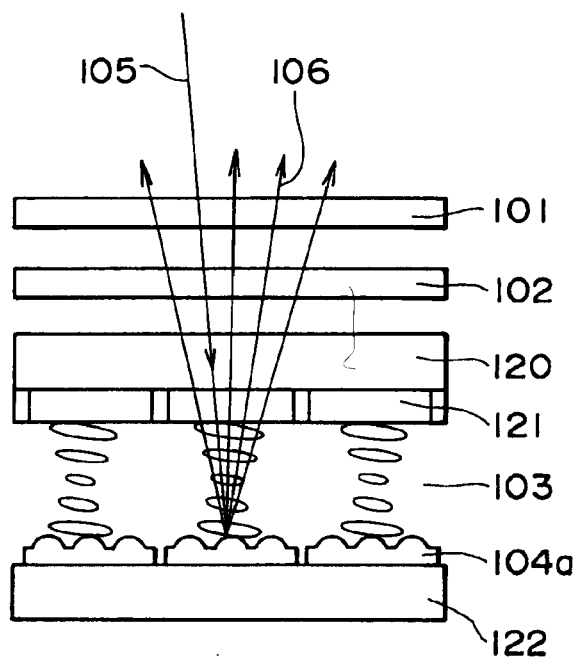
FIG. 2 is a sectional view of a reflection-type color liquid crystal display apparatus to which the present invention is applied.

FIG. 2 shows a sectional view of a reflection-type color liquid crystal display apparatus to which the present invention is applied. The reflection-type color liquid crystal display apparatus is constituted by providing a reflection type color liquid crystal display panel comprising an active matrix substrate 122 in which switching elements and a plurality of pixels are arranged in a matrix shape and the respective pixels are formed with irregular reflection electrodes 104a of irregularities surface shapes of which are smooth; a glass substrate 120 formed with color filters 121 and transparent electrodes; not illustrated; a liquid crystal layer 103 filled between the active matrix substrate 122 and the glass substrate 120, a phase plate 102; and a polarizing plate 101.

According to the reflection type color liquid crystal display panel, outside light such as illumination or the like constitutes a light source, light 105 incident on the panel is subjected to phase modulation at the phase plate 102 and the liquid crystal layer 103, the modulated light is reflected and scattered by the irregular reflection electrodes 104a, and the scattered light is subjected again to phase modulation by the liquid crystal layer 103 and the phase plate 102 to form an image using the variations of reflected light beams 106 emitted from the panel via polarizing plate 101.

Figure 1:
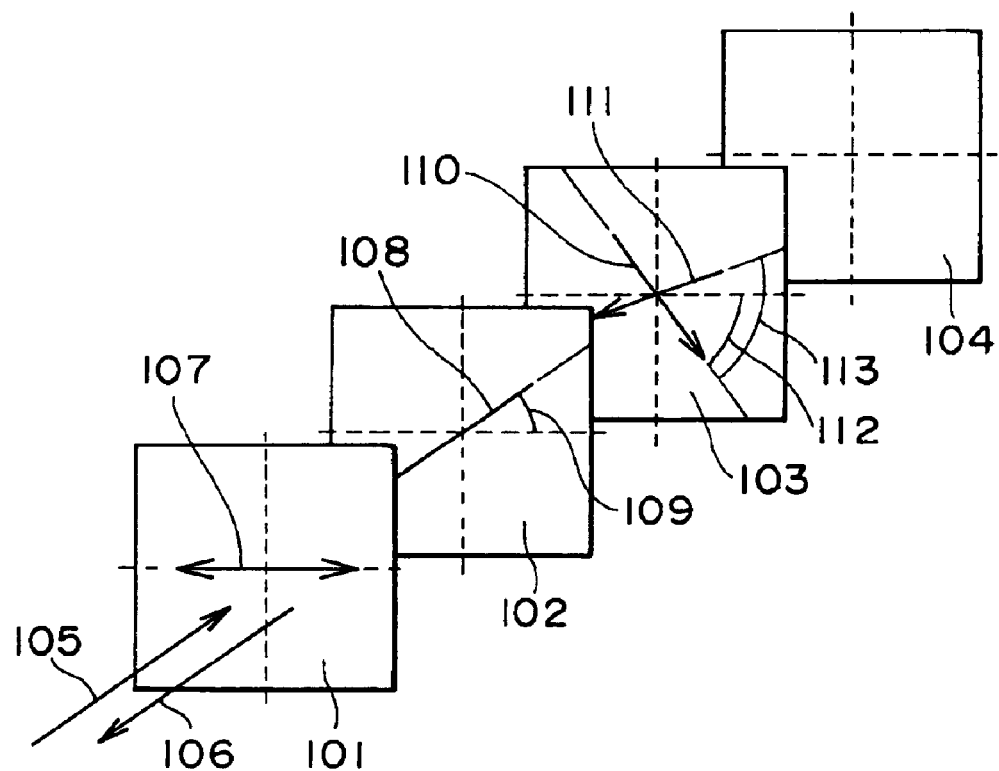
FIG. 1 is a schematic view of a first embodiment of the present invention, showing an explanatory view with regard to parameters for determining a relative relationship of optical axes in respective optical elements constituting a reflection-type color liquid crystal display apparatus and optical characteristics.

FIG. 1 is a diagram showing a first embodiment of the present invention and an explanation will be given of parameters determining a relative relationship of optical axes in respective optical elements constituting the reflection-type color liquid crystal display apparatus and optical characteristics with reference to the drawing.

FIG. 1 schematically shows the polarizing plate 101, the phase plate 102, the liquid crystal layer 103 and the reflection electrode 104 among constituent members of the fir reflection type color liquid crystal display panel.

With a direction of a transmission axis 107 of the polarizing plate 101 assumed as a reference, azimuths of the optical axes of other respective optical elements will be defined. Sign of angle is positive in the counterclockwise direction. An angle made by a retarded phase axis 108 of the phase plate 102 and the direction of the transmission axis 107 is defined as a phase plate orientation angle 109. As parameters of the liquid crystal layer 103, there are an upper side liquid crystal orientation direction 110 which is an orientation direction of liquid crystal on the side of the glass substrate 120, a lower side liquid crystal orientation direction 111 which is an orientation direction of liquid crystal on the side of the active matrix substrate 122, a twist angle 113 corresponding to an angle made by the upper and lower liquid crystal orientation directions and a liquid crystal orientation angle 112 which is an angle made by the upper side liquid crystal orientation direction 110 and the transmission axis 107. Azimuths of arrow marks indicating the upper side liquid crystal orientation direction 110 and the lower side liquid crystal orientation direction 111 signify rubbing directions. Further, as a parameter of the liquid crystal layer 103, there is retardation which is a product of a thickness and refractive index anisotropy of the liquid crystal layer 103. Retardation of the phase plate 102 also constitutes a parameter similarly.

As described above, there are listed five kinds of the parameters (the twist angle 113 of the liquid crystal layer 103, the liquid crystal orientation angle 112, the retardation of the liquid crystal layer 103, the retardation of the phase plate 102, and the phase plate azimuth angle 109) for determining the optical characteristics of the reflection type liquid crystal cell. Some optimization algorithm is necessary to obtain optimum values of these parameters.

In the following, a description will be given of the optimization algorithm. First, a description will be given of the characteristics of the liquid crystal cell for carrying out black image display when voltage is substantially 0 Vrms with reference to FIG. 1. Among incident light 105, a polarized light component orthogonal to the transmission axis 107 is absorbed by the polarizing plate 101 and only a polarized light component in parallel with the transmission axis 107 transmits therethrough. The incident polarized light transmits through the phase plate 102 and the liquid crystal layer 103 and is reflected by the reflection plate 104. The reflected polarized light transmits again through the liquid crystal layer 103 and the phase plate 102 and is incident on the polarizing plate 101. In order to constitute black image display, the reflected polarized light needs to be absorbed substantially completely by the polarizing plate 101. Therefore, it is necessary that the reflected polarized light is substantially linearly polarized light and a direction of the polarized light is orthogonal to the incident polarized light direction. Further, in order to carry out achromatic display, this condition must be satisfied simultaneously for all of colors. Due to symmetry, in order to satisfy the condition, a polarized light state on the reflection plate 104 needs to be that of circularly polarized light. Further, in order to carry out achromatic display, the condition needs to be satisfied simultaneously with respective wavelengths.

From such a viewpoint, the optimization algorithm has been found as mentioned below. First, a consideration is given of a reflection type optical path at and after the reflection electrode 104 in order to calculate the condition of the liquid crystal layer 103 (twist angle ϕ and retardation dΔn) where notation "d" designates a cell gap of the liquid crystal layer 103 and notation Δn designates refractive index anisotropy of liquid crystal molecule. That is, a condition is calculated in which the polarized light on the reflection electrode 104 transmits through the liquid crystal layer 103 and the phase plate 102 and is then absorbed by the polarizing plate 101. As mentioned later, when two terms of the parameters (twist angle ϕ and retardation dΔn) of the liquid crystal layer 103 are optimized, the other three terms of the parameters (liquid crystal orientation angle 112, retardation of the phase plate 102 and phase plate azimuth angle 109) can be calculated substantially automatically.

Figure 4:
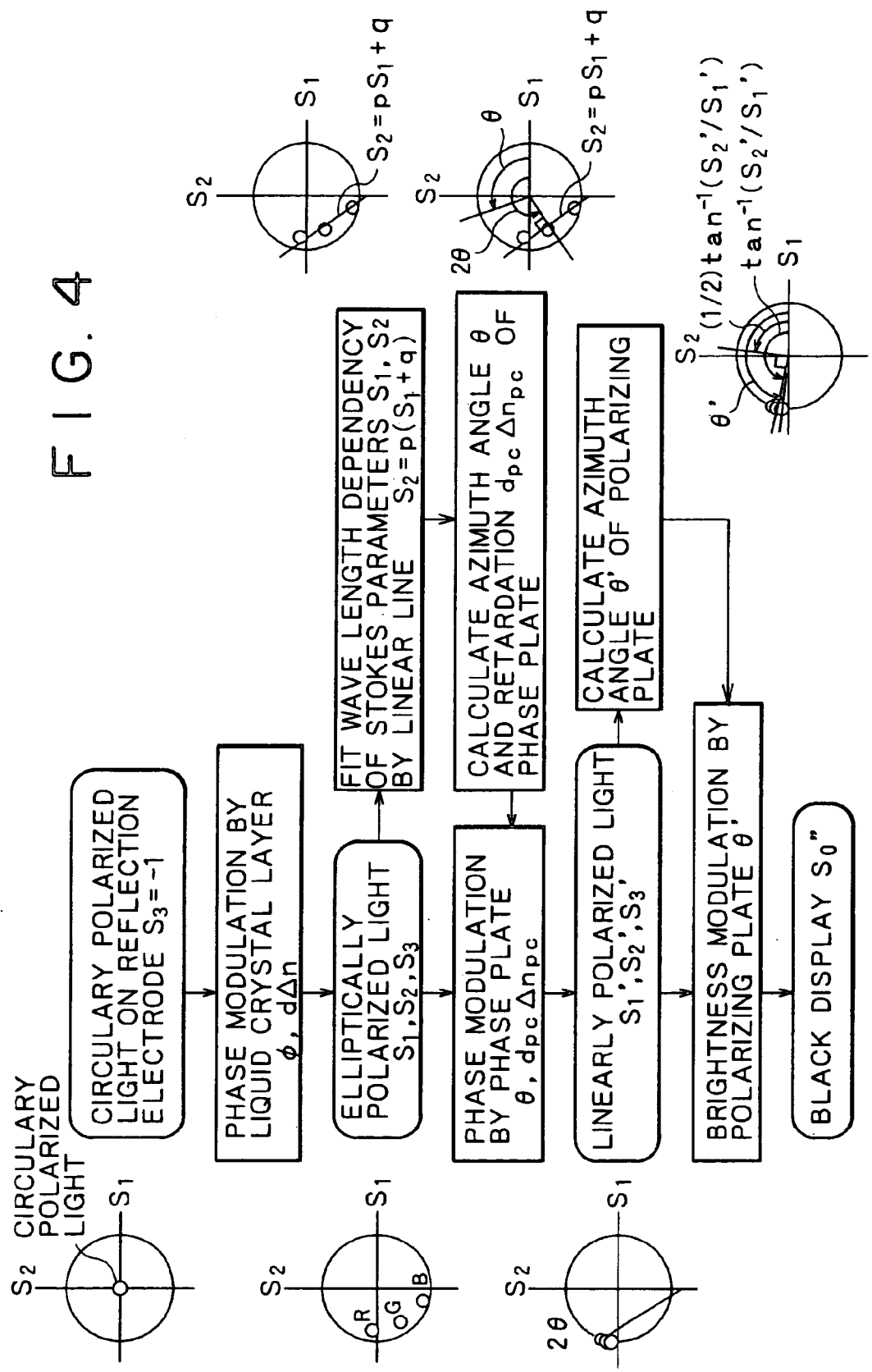
FIG. 4 is a flowchart of an algorithm of optimizing achromatic black display conditions according to the present invention.

FIG. 4 shows a flowchart of the optimization algorithm. In order to represent a polarized light state in each state, it is convenient to use Stokes parameter. Stokes parameter is an index representing the polarized light state by coordinates of a three-dimensional space and the details thereof is described in, for example, "Applied Optics II by Tadao Tsuruta issued by Baifukan". Therefore, schematic diagrams of coordinates of Stokes parameter are also shown concurrently.

In the following, with reference to FIG. 4, a specific description will be given of the algorithm. At first, the circularly polarized light on the reflection electrodes 104 is incident on the liquid crystal layer 103 and phase modulation is carried out in accordance with the twist angle and the retardation of the liquid crystal layer 103. The coordinates represented by Stokes parameter are positioned on a spherical plane having a diameter of 1 in the three-dimensional space. The spherical plane is referred to as Poincare sphere. Coordinates $(S_1, S_2, S_3)$ on Poincare sphere of elliptically polarized light after transmitting through the liquid crystal layer 103 are investigated. In order to convert the elliptically polarized light in the respective wavelengths into linearly polarized light by using the phase plate 102, it is necessary that projections of the coordinates on Poincare sphere of the elliptically polarized light in the respective wavelengths on $S_1$–$S_2$ plane are positioned on a linear line. The projections of the coordinates on Poincare sphere of the elliptically polarized light in the respective wavelengths on $S_1$–$S_2$ plane are fitted by the linear line and the azimuth angle ϕ of the phase plate 102 and the retardation $d_{pc}\Delta n_{pc}$ are calculated. By using the result, the previous elliptically polarized light $(S_1, S_2, S_3)$ is converted into the linearly polarized light $(S_1', S_2', S_3')$. An azimuth angle θ' of the polarizing plate 101 is calculated from the condition of the linearly polarized light $(S_3'=0)$ and a brightness $(S_0'')$ of black display is calculated.

In this way, it is the feature of the algorithm that by optimizing the twist angle ϕ and the retardation dΔn of the liquid crystal layer 103, the other three parameters can be calculated substantially uniquely. Further, although a description will be given in explaining the algorithm, the azimuth angle ϕ of the phase plate 102 and the azimuth angle θ' of the polarizing plate 101 are used as angles with the liquid crystal orientation direction on the electrode assumed as a reference for convenience of the algorithm. Therefore, the azimuth angle θ of the phase plate 102 and the azimuth angle θ' of the polarizing plate 101 calculated by the algorithm need to be pertinently converted into the phase plate azimuth angle 109 and the liquid crystal orientation angle 112 which are the angles defined in FIG. 1. The same goes with other embodiment of the present invention as follows.

A detailed description will be given of the algorithm as follows. When the circularly polarized light is incident on the liquid crystal layer 103, an electric field vector of light emitted from the liquid crystal layer 103 is shown by the following equation, $$\begin{pmatrix} E_x \\ E_y \end{pmatrix} = \frac{1}{\sqrt{2}} J_\infty \begin{pmatrix} 1 \\ i \end{pmatrix} \quad (1)$$

where $$J_\infty = \begin{pmatrix} a & b \\ -b^* & a^* \end{pmatrix} \quad (2)$$

J∞ is Jones' matrix and shown by the following equations, $$a = \cos\phi\cos\beta + \frac{1}{\sqrt{1+\alpha^2}}\sin\phi\sin\beta - \frac{i\alpha}{\sqrt{1+\alpha^2}}\cos\phi\sin\beta \quad (3)$$

$$b = -\sin\phi\cos\beta + \frac{1}{\sqrt{1+\alpha^2}}\cos\phi\sin\beta - \frac{i\alpha}{\sqrt{1+\alpha^2}}\sin\phi\sin\beta \quad (4)$$

$$\alpha = \frac{d\Delta n}{\lambda}\frac{\pi}{\phi} \quad (5)$$

$$\beta = \phi\sqrt{1+\alpha^2} \quad (6)$$

where notation ϕ designates the twist angle of the liquid crystal layer 103 and notation "d" designates the cell gap of the liquid crystal layer 103, notation Δn designates refractive index anisotropy of liquid crystal molecule and notation λ designates wavelength.

Calculating Equation (1) by using Equation (2) through Equation (6) results as follows.

$$\begin{pmatrix} E_x \\ E_y \end{pmatrix} = \frac{1}{\sqrt{2}} \begin{pmatrix} a + ib \\ -b^* + ia^* \end{pmatrix} = \quad (7)$$

-continued $$\frac{1}{\sqrt{2}}\begin{pmatrix} e^{-i\phi}\left(\cos\beta + i\frac{\sin\beta}{\sqrt{1+\alpha^2}}\right) - e^{i\phi}\frac{i\alpha}{\sqrt{1+\alpha^2}}\sin\beta \\ -e^{i\phi}\left(\frac{\alpha}{\sqrt{1+\alpha^2}}\sin\beta + i\cos\beta\right) - e^{i\phi}\frac{\sin\beta}{\sqrt{1+\alpha^2}} \end{pmatrix}$$

Calculating Stokes parameter of the light emitted from the liquid crystal layer 103 based on the above equation results as follows.

$$S_1 = \frac{2\alpha\sin\beta}{\sqrt{1+\alpha^2}}\left(\sin2\phi\cos\beta - \frac{\cos2\phi\sin\beta}{\sqrt{1+\alpha^2}}\right) \tag{9}$$

$$S_2 = -\frac{2\alpha\sin\beta}{\sqrt{1+\alpha^2}}\left(\cos2\phi\cos\beta + \frac{\sin2\phi\sin\beta}{\sqrt{1+\alpha^2}}\right) \tag{10}$$

$$S_3 = \cos^2\beta + \frac{1-\alpha^2}{1+\alpha^2}\sin^2\beta \tag{11}$$

The condition that the projections on $S_1$–$S_2$ plane of the coordinates on Poincare sphere constitute the linear line with respect to the wavelength $\lambda$ is calculated by carrying out fitting in the respective twist angle $\phi$ and retardation $d\Delta n$ of the liquid crystal layer 103 by using the following equation and numerically searching a condition of minimizing mean square error thereof.

$$S_2 = pS_1 + q \tag{12}$$

The azimuth angle $\theta$ of the phase plate 102 is calculated by the following equation from inclination p of Equation (12), $$\theta = \frac{1}{2}\left(\tan^{-1}p + \frac{\pi}{2}\right) \tag{13}$$

where notation $\theta$ designates an angle made by the orientation direction of liquid crystal molecule on the reflection electrode 104 and the advanced phase axis of the phase plate 102. Further, $0 \leq \tan^{-1} p < \pi$.

Stokes parameter $S_0'$, $S_1'$, $S_2'$, $S_3'$ of the light emitted from the phase plate 102 is calculated by the following equation.

$$\begin{pmatrix} S_0' \\ S_1' \\ S_2' \\ S_3' \end{pmatrix} = \begin{pmatrix} 1 & 0 & 0 & 0 \\ 0 & \cos^2 2\theta + \sin^2 2\theta\cos\Gamma & \sin 2\theta\cos 2\theta(1-\cos\Gamma) & -\sin 2\theta\sin\Gamma \\ 0 & \sin 2\theta\cos 2\theta(1-\cos\Gamma) & \sin^2 2\theta + \cos^2 2\theta\cos\Gamma & \cos 2\theta\sin\Gamma \\ 0 & \sin 2\theta\sin\Gamma & -\cos 2\theta\sin\Gamma & \cos\Gamma \end{pmatrix} \begin{pmatrix} S_0 \\ S_1 \\ S_2 \\ S_3 \end{pmatrix} \tag{14}$$

where notation $\Gamma$ designates a phase difference between inherent polarized light beams after passing through the phase plate 102 and is shown by $\Gamma = 2\pi d_{pc}\Delta n_{pc}/\lambda$ by using the thickness $d_{pc}$ and the refractive index anisotropy $\Delta n_{pc}$ of the phase plate 102. Further, light intensity $S_0''$ after transmitting through the polarizing plate 101 is calculated by the following equation, $$S_0'' = 1/2(S_0' + S_1'\cos2\theta' + S_2'\sin2\theta') \tag{15}$$

where notations $\theta'$ designates an angle made by the orientation direction of liquid crystal molecule on the reflection electrode 104 and the transmission axis of the polarizing plate 101 and is calculated by the following equation with respect to certain wavelength $\lambda$.

$$\theta' = \frac{1}{2}\tan^{-1}\frac{S_2'(\lambda)}{S_1'(\lambda)} + \frac{\pi}{2} \tag{16}$$

Further, the retardation $d_{pc}\Delta n_{pc}$ of the phase plate 102 is given by the following equation from the condition of $S_3'=0$.

$$d_{PC}\Delta n_{PC} = \frac{\lambda}{\pi}\tan^{-1}\frac{S_3(\lambda)}{S_2(\lambda)\cos2\theta - S_1(\lambda)\sin2\theta} \tag{17}$$

In the following calculation, E light source is used as a light source. Polycarbonate is used for the phase plate 102 and its physical property value is used in calculation.

Figure 5:
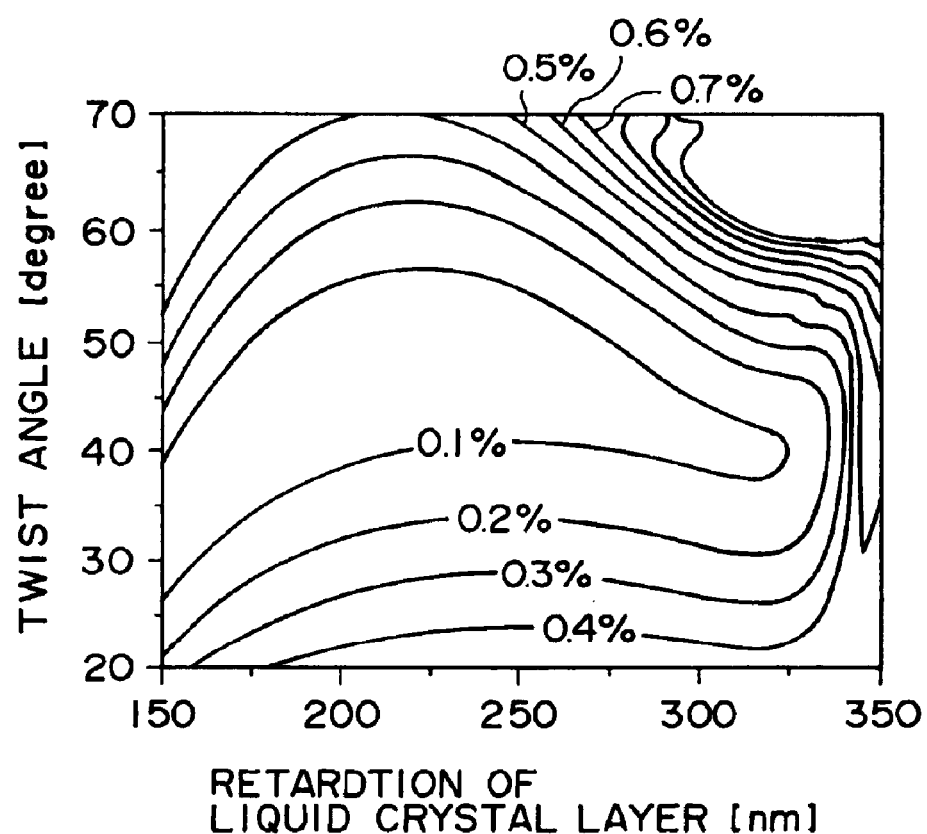
FIG. 5 is a diagram showing calculated results for reflectance when voltage is 0 Vrms according to the present invention.
Figure 6:
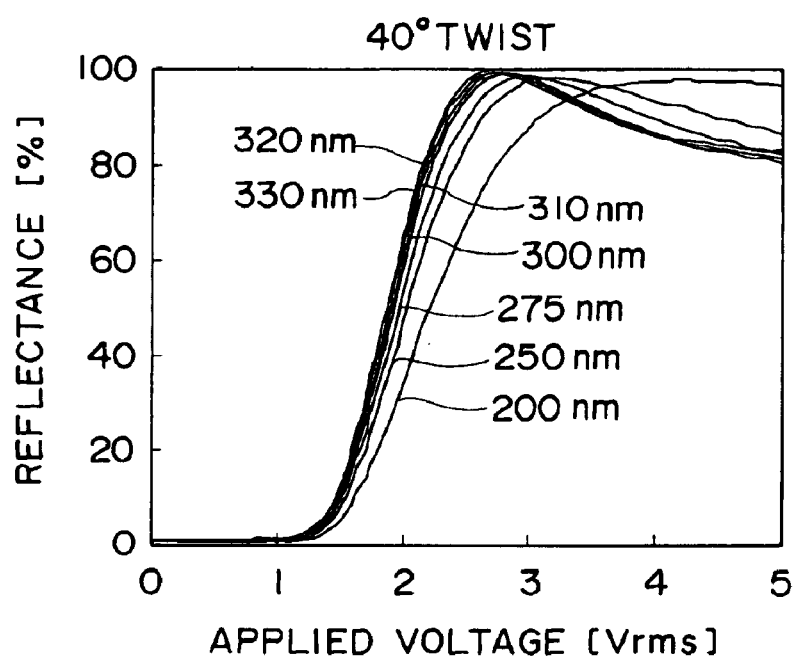
FIG. 6 is a voltage-reflectance characteristic diagram when a twist angle is 40 degrees according to the present invention.
Figure 7:
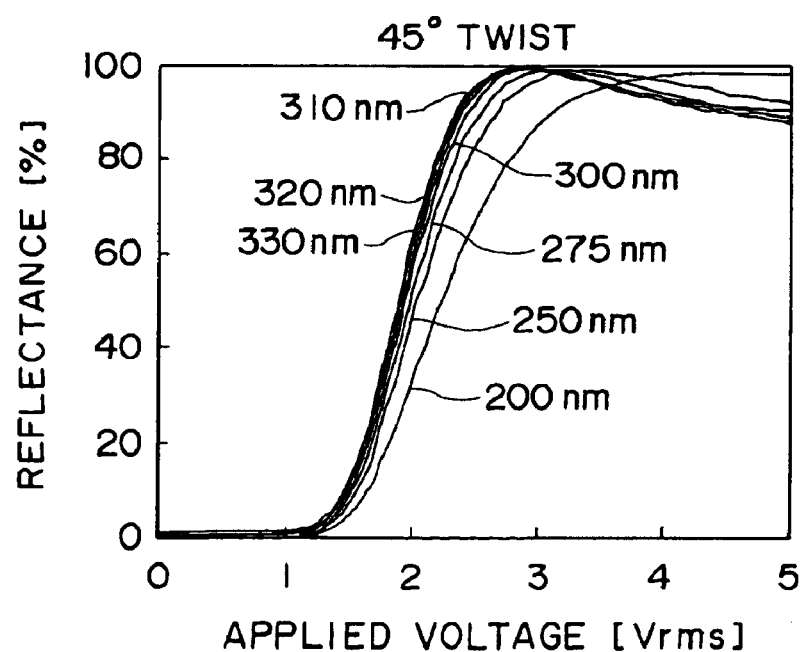
FIG. 7 is a voltage-reflectance characteristic diagram when a twist angle is 45 degrees according to the present invention.
Figure 8:
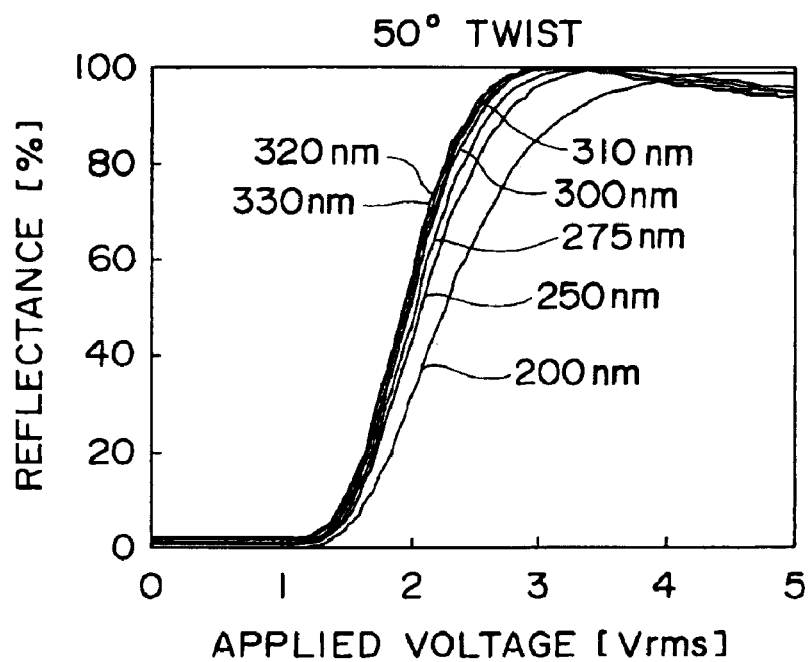
FIG. 8 is a voltage-reflectance characteristic diagram when a twist angle is 50 degrees according to the present invention.
Figure 9:
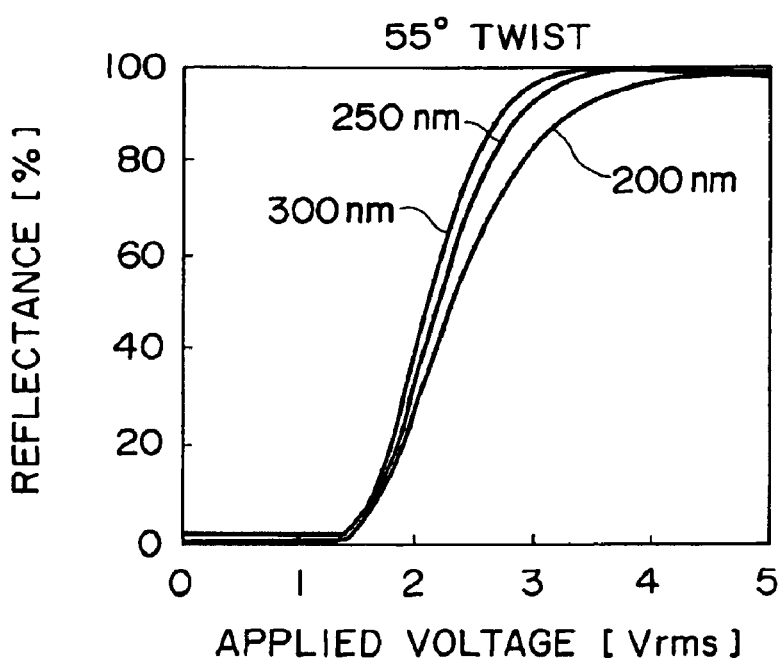
FIG. 9 is a voltage-reflectance characteristic diagram when a twist angle is 55 degrees according to the present invention.
Figure 10:
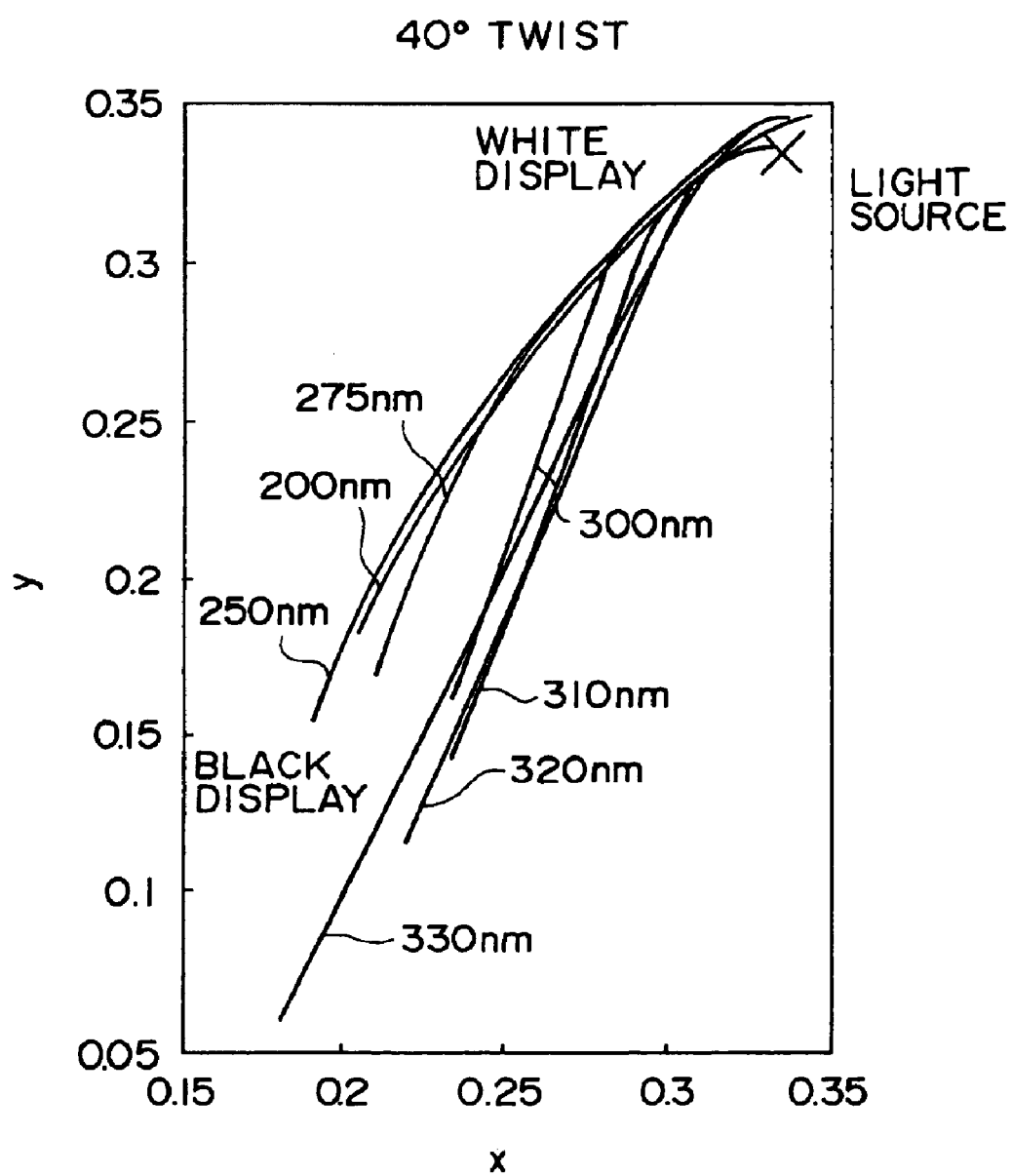
FIG. 10 is a diagram showing the voltage dependency of chromaticity when a twist angle is 40 degrees according to the present invention.
Figure 11:
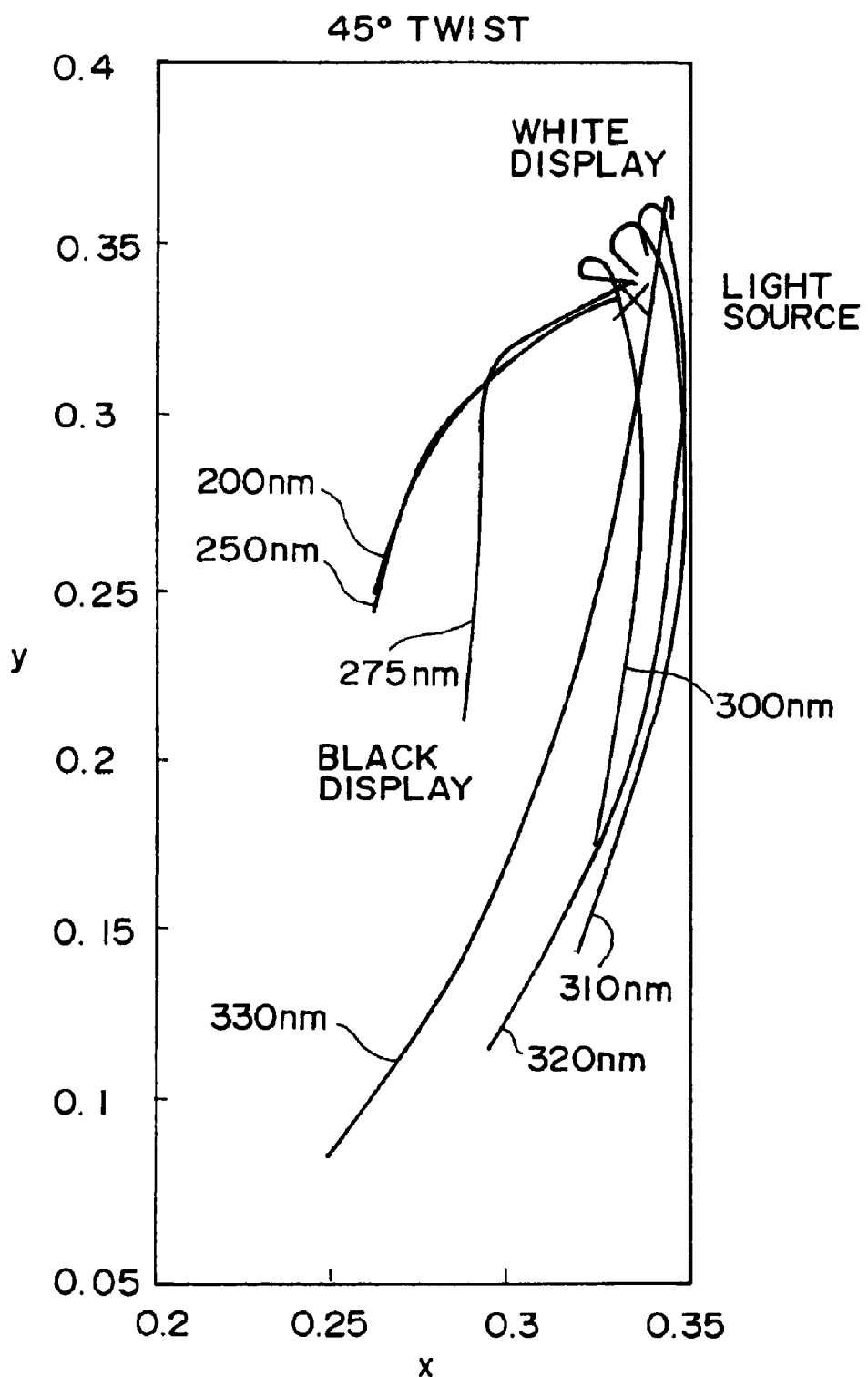
FIG. 11 is a diagram showing the voltage dependency of chromaticity when a twist angle is 45 degrees according to the present invention.

FIG. 5 shows calculated results for reflectance when voltage is 0 Vrms by using the above-described algorithm. FIG. 5 shows equi-reflectance curves (reflectance 0.1%, 0.2%, 0.3%, . . . ) when voltage is 0 Vrms. As described above, the parameters which are varied independently in the algorithm are the retardation and the twist angle of the liquid crystal layer 103 and accordingly, the abscissa and the ordinate of FIG. 5 are the retardation and the twist angle of the liquid crystal layer 103. For the retardation of the phase plate 102, the azimuth angle of the phase plate 102 and the liquid crystal orientation angle, values optimized according to respective conditions are used.

According to conditions for the liquid crystal cell having the lowest reflectance, the retardation of the liquid crystal layer 103 is substantially 340 nm or smaller and the twist angle falls in a range equal to or larger than about 20 degrees and equal to or smaller than 70 degrees. The condition of the reflectance equal to or smaller than 0.4% is provided even in a region where the retardation of the liquid crystal layer 103 is smaller than 150 nm. However an amount of change of the retardation of the liquid crystal layer 103 means that a difference between that in black image display and that in white image display constitutes a phase change of about a quarter wavelength at maximum. Therefore, in order to sufficiently increase the reflectance in white image display, the retardation in correspondence with the phase change of the quarter wavelength (137.5 nm in wavelength 550 nm) or more is needed as the retardation of the liquid crystal layer 103. Actually, even if voltage is applied to the liquid crystal cell, all of liquid crystal molecules are not aligned completely in the voltage applying direction and therefore, the retardation value of the liquid crystal layer 103 is larger than the quarter wavelength and 150 nm or more seems to be necessary therefor. Therefore, the preferable condition of the retardation of the liquid crystal layer 103 is equal to or larger than 150 nm and equal to or smaller than 340 nm.

Further, a condition of providing reflectance of black display of 0.1% or smaller is more preferable in view of the contrast ratio, and it is more preferable that the retardation of the liquid crystal layer 103 is equal to or larger than 150 nm and equal to or smaller than 325 nm and the twist angle is equal to or larger than 40 degrees and equal to or smaller than 55 degrees.

FIGS. 6 through 9 show calculated results for voltage-reflectance of respective twists 40°, 45°, 50°, 55° with regard to representative conditions of the liquid crystal layer 103 and the phase plate 102 and relative angles of optical axes of the respective optical elements. It is known that in any condition, good white and black displaying is provided (black display when applied voltage 0 Vrms—reflectance 0%).

Table 1 (FIG. 27) shows the respective parameter conditions (retardation, twist angle, liquid crystal orientation angle of the liquid crystal layer 103, retardation of the phase plate 102, phase plate azimuth angle). At the same time, the contrast ratio is also shown. Interpolation between respective representative conditions allows an arbitrary condition between the respective representative conditions to easily be calculated.

FIGS. 10 through 13 show calculated results for x-y chromaticity coordinates in line with the voltage-reflectance characteristic shown by FIGS. 6 through 9. As a whole, white display is positioned at a chromaticity substantially equivalent to the chromaticity of the light source and the chromaticity is significantly changed while shifting to black display. This is a result of changing the chromaticity from blue to purple direction. Further, although at a glance, the chromaticity change amount seems to be large on the black display side, this means reflecting the wavelength dependency of shape of small reflectance spectra since the reflectance of the black display is low and the sufficient contrast ratio is provided in the respective conditions and accordingly, any condition seems to be satisfactory for image display. An intermediate position between white display and black display constitutes an intermediate gray scale.

Figure 12:
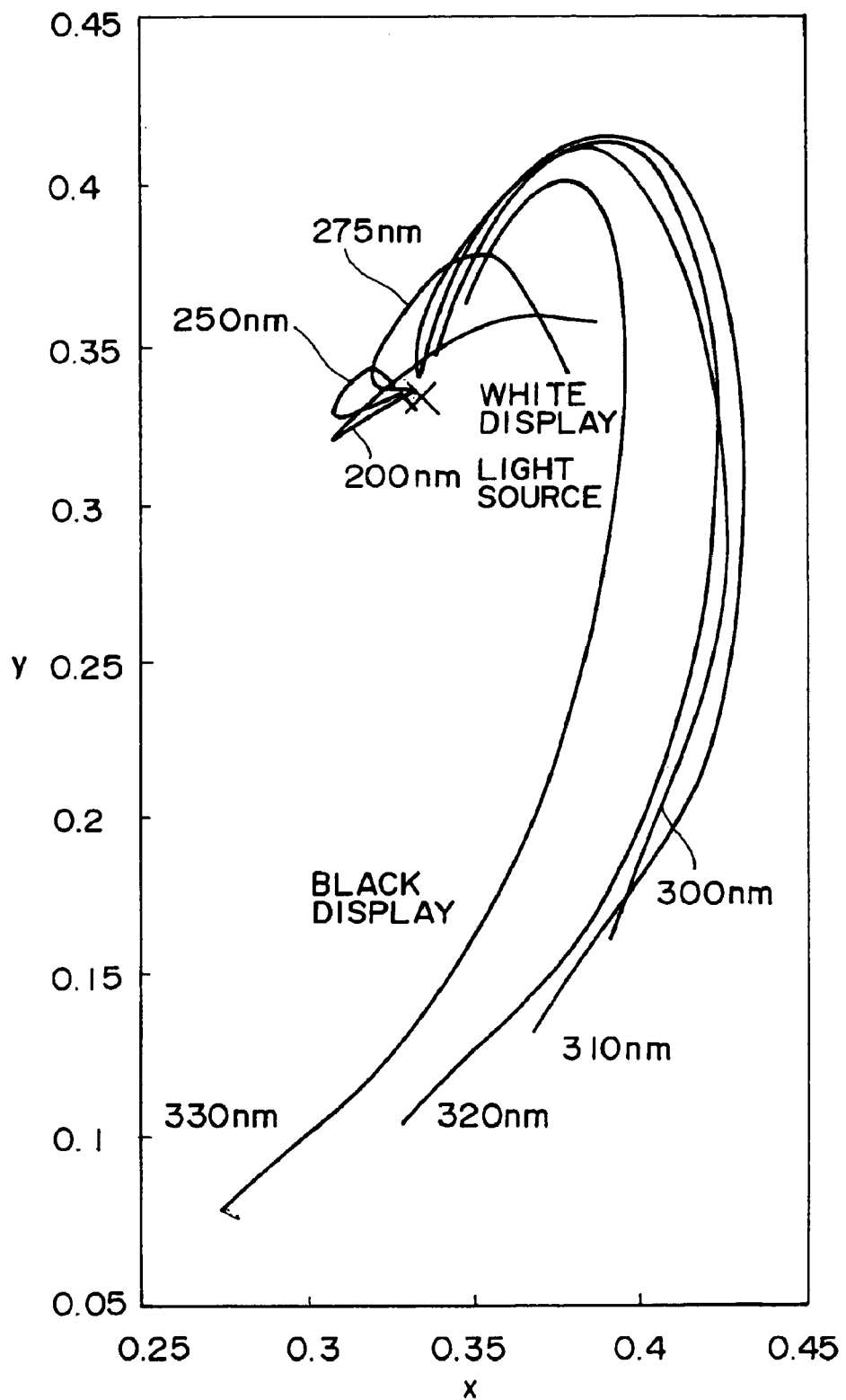
FIG. 12 is a diagram showing the voltage dependency of chromaticity when a twist angle is 50 degrees according to the present invention.
Figure 13:
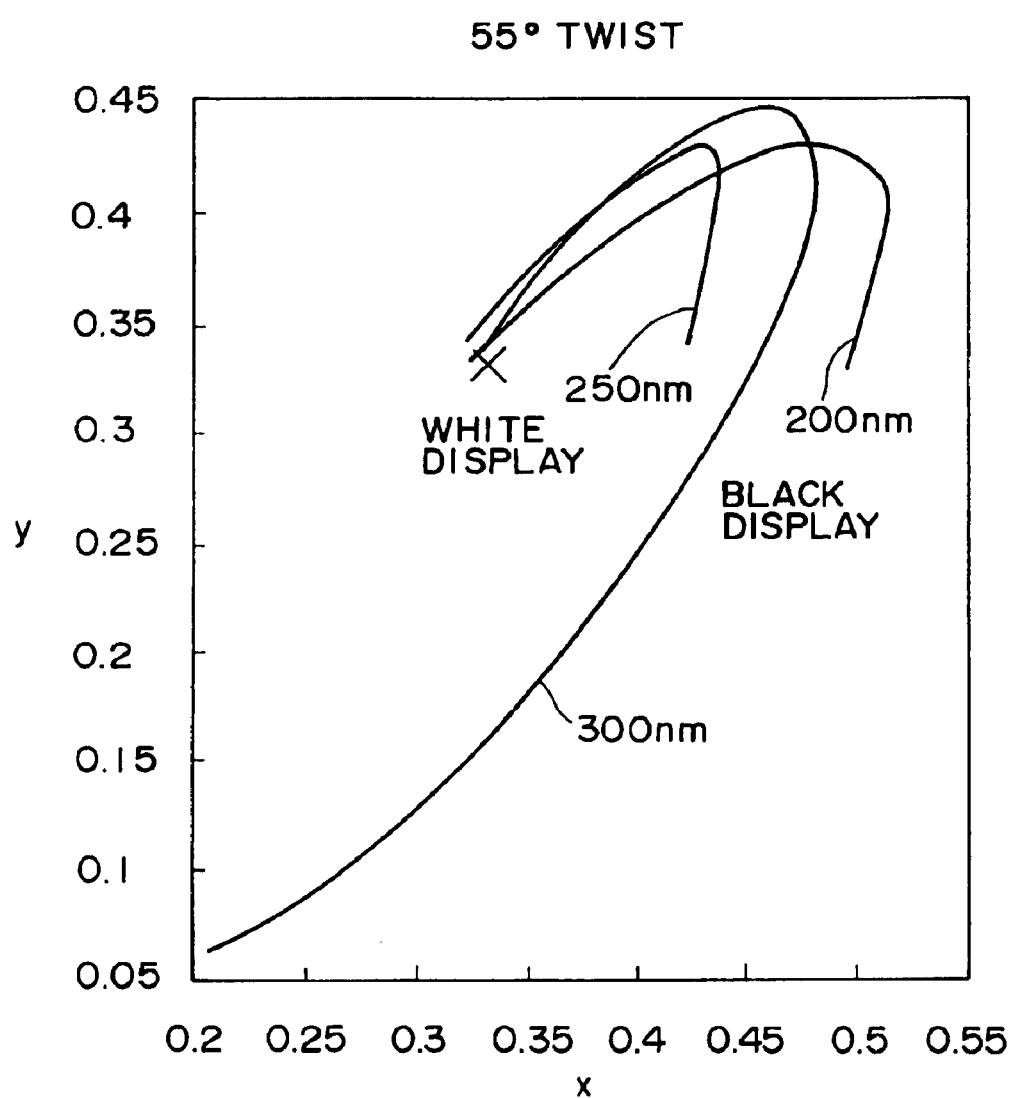
FIG. 13 is a diagram showing the voltage dependency of chromaticity when a twist angle is 55 degrees according to the present invention.

Further, it is more preferable that chromaticity coordinates in black display are disposed substantially proximate to chromaticity coordinates of the light source. Specifically, the retardation of the liquid crystal layer 103 is about 250 nm, the twist angle is about 50 degrees, the liquid crystal orientation angle is about −26 degrees, the retardation of the phase plate 102 is about 379 nm and the phase plate azimuth angle is about 76 degrees (FIG. 12). These values designate central values and are values having varying widths to some extent.

Although in FIG. 1, the respective optical elements are represented by a quadrangular shape for convenience, this does not specify, for example, the direction of the transmission axis of the polarizing plate relative to the substrate or the like. With regard to the angles of the optical axes of the respective optical elements relative to the substrate which define the relationship of relative angles of the optical axes of the respective optical elements, optimum angles are determined from a relationship between a method of using the reflectance type color liquid crystal display apparatus and the viewing angle characteristic. The viewing angle characteristic, mentioned here, is the angle dependency of the characteristic change in viewing in a direction deviated from an orthogonal line direction of a display plane in respective display characteristics (brightness, contrast ratio and the like) when there are used, as references, characteristics in viewing a display image from the orthogonal line direction of the display plane of the reflection-type color liquid crystal display apparatus.

The characteristic of the reflectance with respect to the voltage of the reflection-type color liquid crystal display apparatus according to the first embodiment is of a normally black type for carrying out black image display on a low voltage side and carrying out white image display at certain voltage on a high voltage side.

Figure 3:
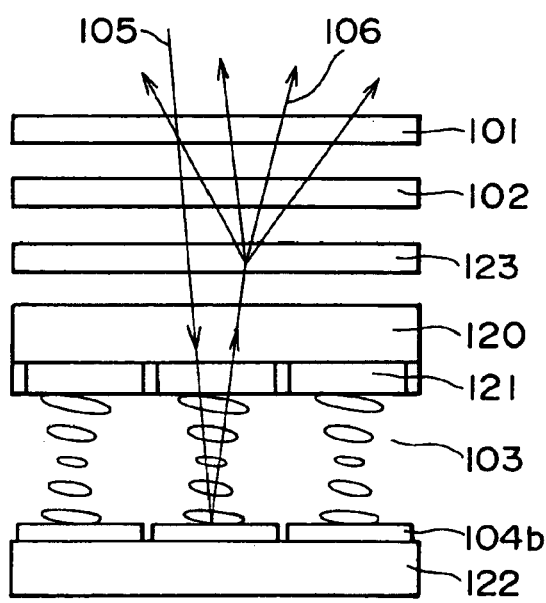
FIG. 3 is a sectional view partially modifying the reflection-type color liquid crystal display apparatus to which the present invention is applied.

FIG. 3 shows a sectional view in which a scattering plate 123 is disposed between the phase plate 102 and the glass substrate 120 in place of the irregular reflection electrodes 104a shown by the reflection-type color liquid crystal display apparatus of FIG. 2. In this case, the surface of the reflection electrode 104 has a flat shape.

Further, the arrangement of the scattering plate 123 is not limited thereto but the scattering plate 123 may be arranged, for example, between the polarizing plate 101 and the phase plate 102. Further, the polarizing plate 101 or the phase plate 102 per se may be a member having a scattering property. Further, the scattering plate 123 may serve also as an adhering agent for the polarizing plate 101 or the phase plate 102.

Further, although in FIGS. 2 and 3, the color filters 121 are provided on the side of the glass substrate 120, the color filters 121 may be provided on the side of the active matrix substrate 122.

FIG. 14 is a schematic view of a second embodiment of the present invention, showing an explanatory view with regard to parameters for determining a relative relationship of optical axes in respective optical elements constituting a reflection-type color liquid crystal display apparatus and optical characteristics.

A difference from the first embodiment resides in that whereas the display system of the first embodiment is normally black, the display system of the second embodiment is normally white.

In order to realize achromatic white display, it is necessary that light of all wavelengths is brought into a state as proximate to linearly polarized light as possible on a reflection electrode 104. That is, it is preferable that an optical condition between the reflection electrode 104 and a polarizing plate 101 constitutes 0 phase difference or an ideal half wavelength plate. Further, it is effective to utilize optical rotating power in order to restrain to reduce wavelength dependency of phase modulation. Therefore, it is assumed that a direction of polarization of linearly polarized light on the reflection electrode 104 and an orientation direction of liquid crystal molecules on the reflection electrode 104 are in parallel with or orthogonal to each other.

In the following, a description will be given of a case in which the direction of polarization of linearly polarized light on the reflection electrode 104 and the orientation direction of liquid crystal molecules on the reflection electrode 104 are in parallel with each other.

Figure 15:
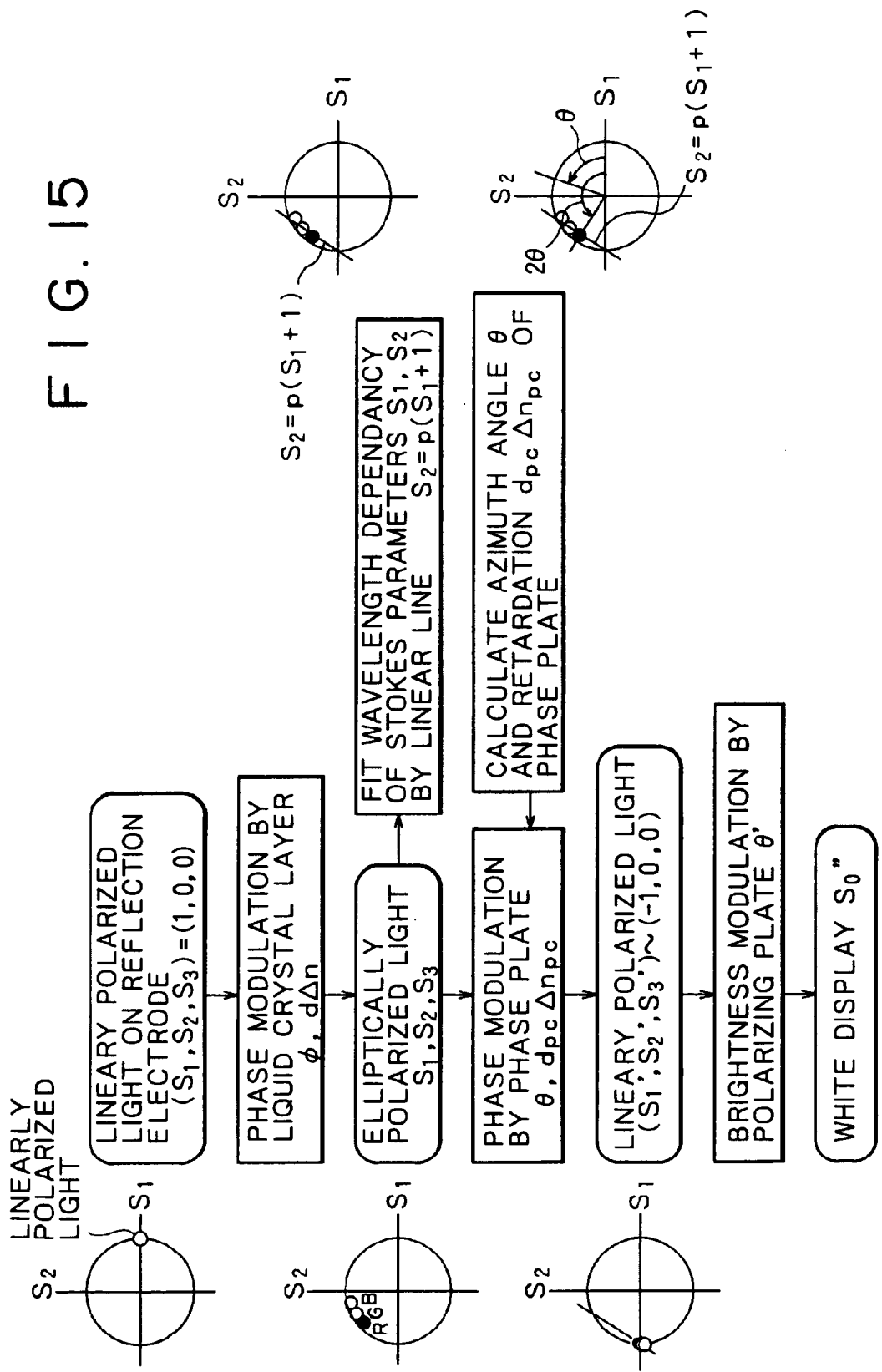
FIG. 15 is a flowchart of an algorithm of optimizing achromatic white display conditions according to the present invention.
Figure 16:
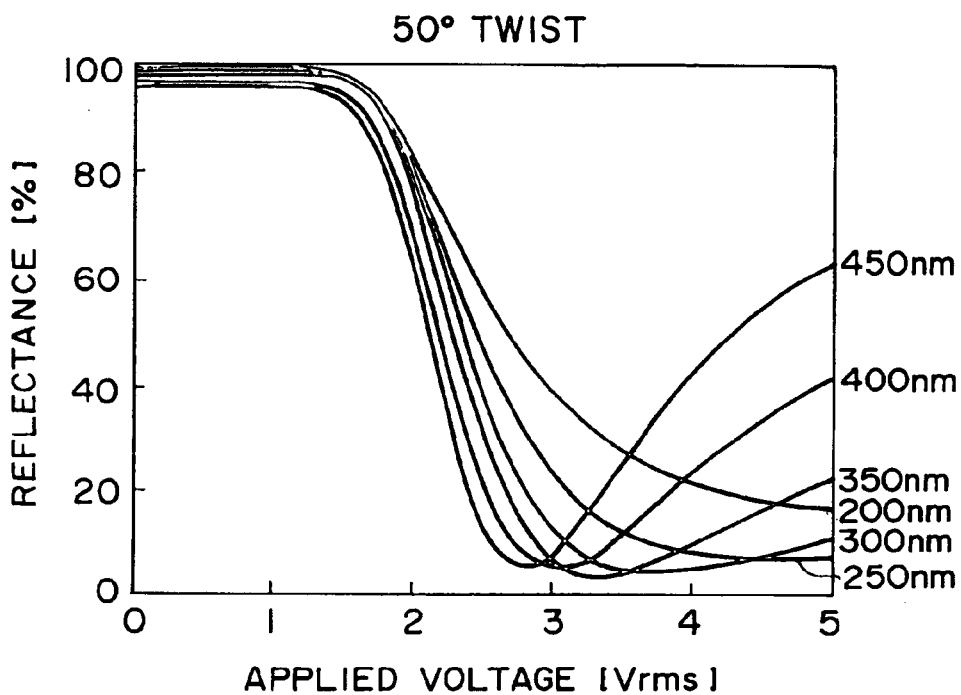
FIG. 16 is a voltage-reflectance characteristic diagram when a twist angle is 50 degrees according to the present invention.
Figure 17:
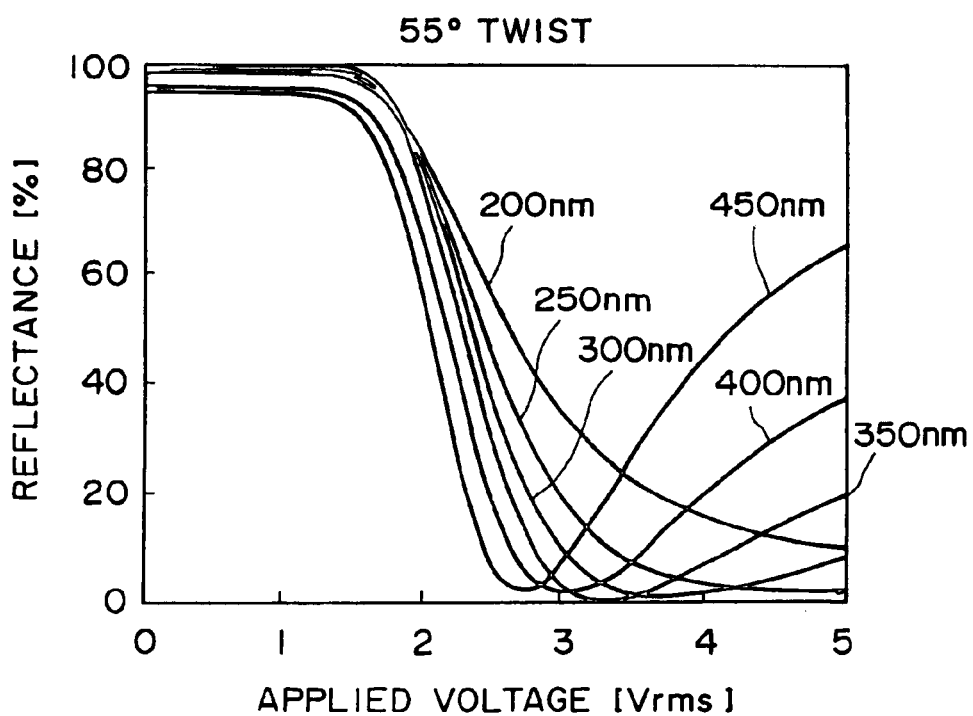
FIG. 17 is a voltage-reflectance characteristic diagram when a twist angle is 55 degrees according to the present invention.
Figure 18:
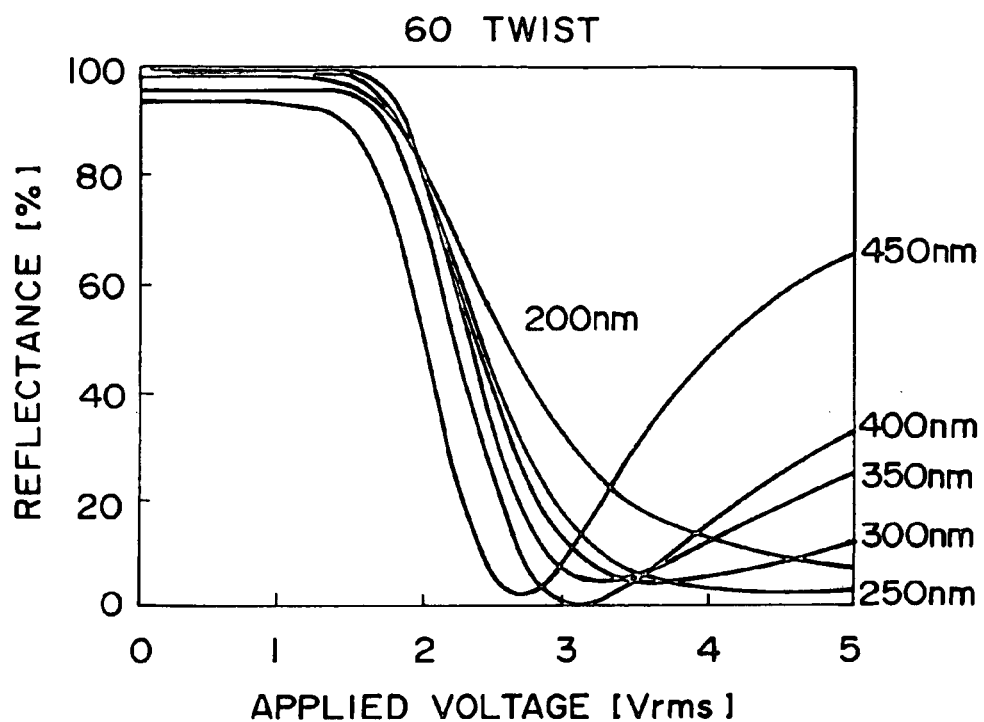
FIG. 18 is a voltage-reflectance characteristic diagram when a twist angle is 60 degrees according to the present invention.
Figure 19:
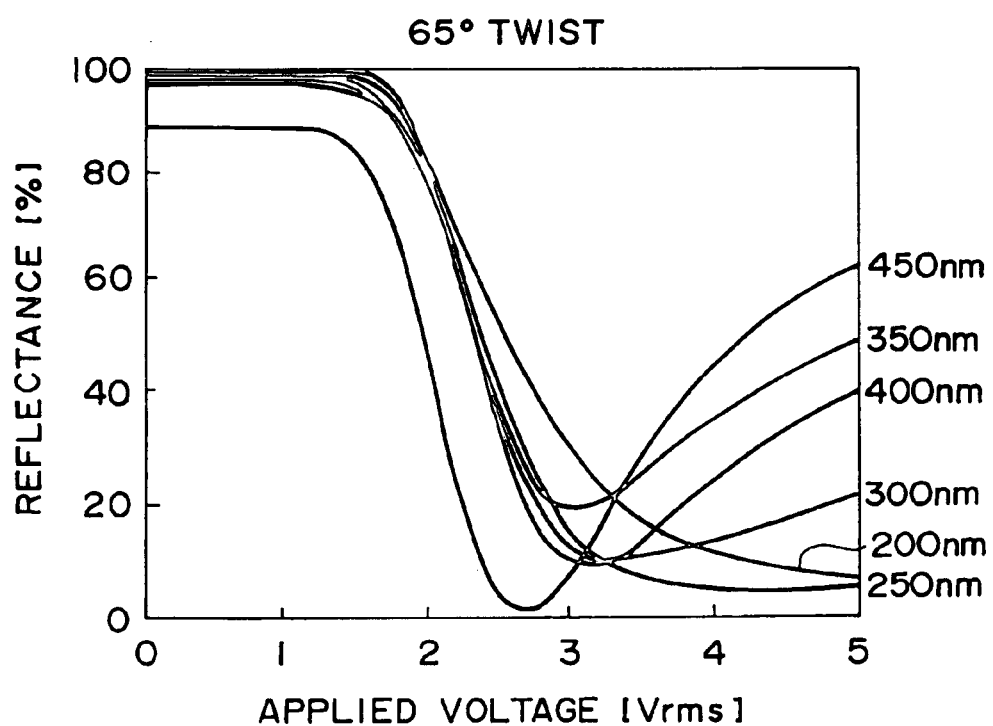
FIG. 19 is a voltage-reflectance characteristic diagram when a twist angle is 65 degrees according to the present invention.

FIG. 15 shows a flowchart of an optimization algorithm of an achromatic white display condition.

Points of change of the optimization algorithm of the achromatic white display condition from that of the achromatic black display resides in two points of 1) circularly polarized light on the reflection electrode ($S_3 = -1$)→ linearly polarized light (($S_1, S_2, S_3$)=(1, 0, 0)), and 2) fitting by linear line $S_2 = pS_1 + q$→ fitting by $S_2 = p(S_1 + 1)$. Fitting is carried out by $S_2 = p(S_1 + 1)$ to produce a polarized light state after transmitting through a phase plate 102 to ($S_1', S_2', S_3'$)=(−1, 0, 0).

A detailed explanation will be given of the algorithm as follows. When linearly polarized light is incident on a liquid crystal layer 103, an electric field vector of light emitted from the liquid crystal layer 103 is shown by the following equation.

$$\begin{pmatrix} E_x \\ E_y \end{pmatrix} = J_\infty \begin{pmatrix} 1 \\ 0 \end{pmatrix} = \begin{pmatrix} a & b \\ -b^* & a^* \end{pmatrix} \begin{pmatrix} 1 \\ 0 \end{pmatrix} = \begin{pmatrix} a \\ -b^* \end{pmatrix} \quad (18)$$

Equation (18) is calculated using Equations (2) through (6) and Stokes parameter of the light emitted from the liquid crystal layer 103 is calculated as shown by the following equations. Incidentally, these are equations when $(S_1, S_2, S_3)=(1, 0, 0)$ on the reflection electrode 104.

$$S_1 = \frac{1}{1+\alpha^2}\cos2\phi(\alpha^2 + \cos2\beta) + \frac{\sin2\phi\sin2\beta}{\sqrt{1+\alpha^2}} \quad (20)$$

$$S_2 = \frac{1}{1+\alpha^2}\sin2\phi(\alpha^2 + \cos2\beta) - \frac{\cos2\phi\sin2\beta}{\sqrt{1+\alpha^2}} \quad (21)$$

$$S_3 = \frac{2\alpha}{1+\alpha^2}\sin^2\beta \quad (22)$$

When a phase difference of a half wavelength is constituted by a total of the liquid crystal layer 103 and the phase plate 102, Stokes parameter after passing through the phase plate 102 is $(S_1, S_2, S_3)=(-1, 0, 0)$. In order to satisfy this condition, the projection of the Stokes parameter on $S_1$–$S_2$ plane after transmitting through the liquid crystal layer 103 may be on a linear line shown by the following equation.

$$S_2 = p(S_1+1) \quad (23)$$

Further, similarly to the previous calculation of the black display condition, the twist angle φ and the retardation dΔn of the liquid crystal layer 103 are calculated for minimizing mean square error. A view angle of the phase plate 102 is calculated by the inclination p of Equation (23) and Equation (13). The optical intensity after transmitting through the polarizing plate 101 is calculated by Equation (14) and Equation (15), where with regard to θ' which is an angle made by the orientation direction of liquid crystal molecules on the reflection electrode 104 and the transmission axis of the polarizing plate 101, θ'=0 or θ'=π/2.

In the following equation, E light source is used as a light source. Polycarbonate is used for the phase plate 102 and a physical property value thereof is used for calculation.

FIGS. 16 through 19 show calculated results of for voltage-reflectance respectively at twist angles 50°, 55°, 60°, 65° with regard to representative conditions of the liquid crystal layer 103 and the phase plate 102 and relative angles of optical axes of the respective optical elements. It is known that in any condition, good white and black displaying is provided (white display when applied voltage 0 Vrms and reflectance 100%).

Table 2 (FIG. 28) shows respective parameter conditions (retardation and twist angle of the liquid crystal layer 103, and retardation of the phase plate and azimuth angle of the phase plate 102). At the same time, the contrast ratio is also shown. Interpolation between respective representative conditions allows an arbitrary condition between the respective representative conditions to easily be calculated.

Figure 20:
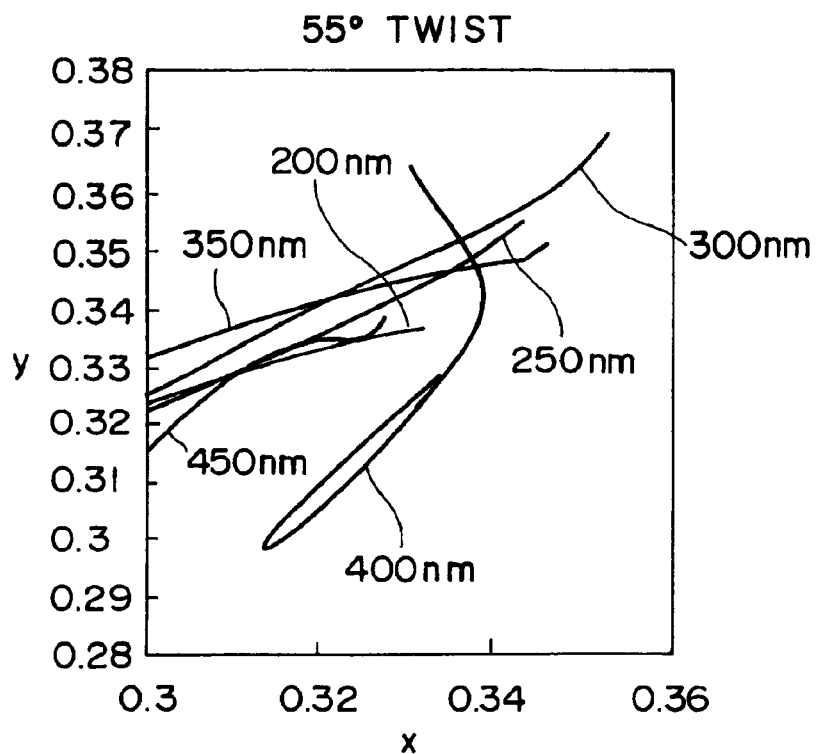
FIG. 20 is a diagram showing the voltage dependency of chromaticity when a twist angle is 55 degrees according to the present invention.
Figure 21:
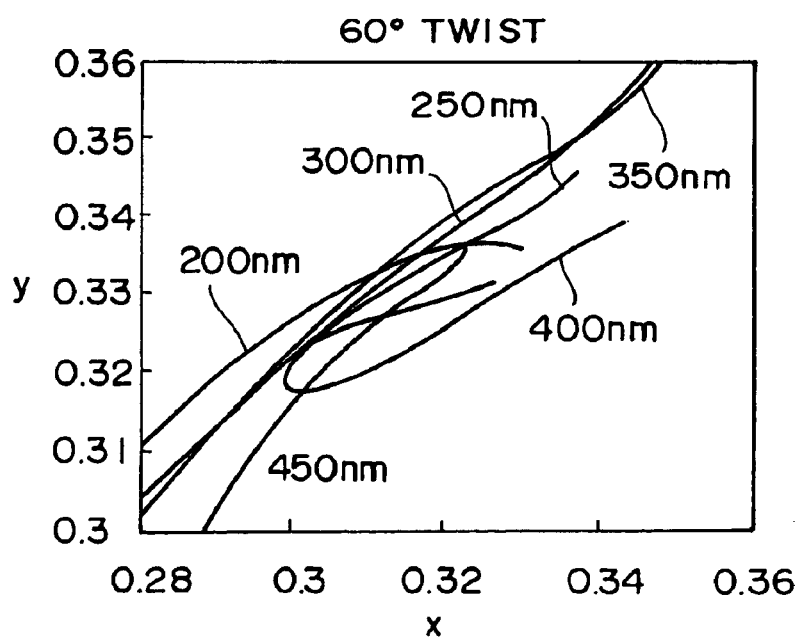
FIG. 21 is a diagram showing the voltage dependency of chromaticity when a twist angle is 60 degrees according to the present invention.

Particularly, conditions which can realize a high contrast ratio fall in a range of twist angle of 55 degrees to 60 degrees. FIGS. 20 and 21 show calculated results for x-y chromaticity coordinates in line with voltage-reflectance characteristics shown by FIGS. 17 and 18. The retardation of the liquid crystal layer 103 is about 400 nm, the twist angle falls in a range of about 55 degrees to about 60 degrees, the liquid crystal orientation angle falls in a range of about 73 degrees to about 74 degrees, the retardation of the phase plate 102 falls in a range of about 162 to 196 nm and the phase plate orientation angle falls in a range of about 73 degrees to 74 degrees. These values indicate central values and are values having variation widths to some extent.

Figure 22:
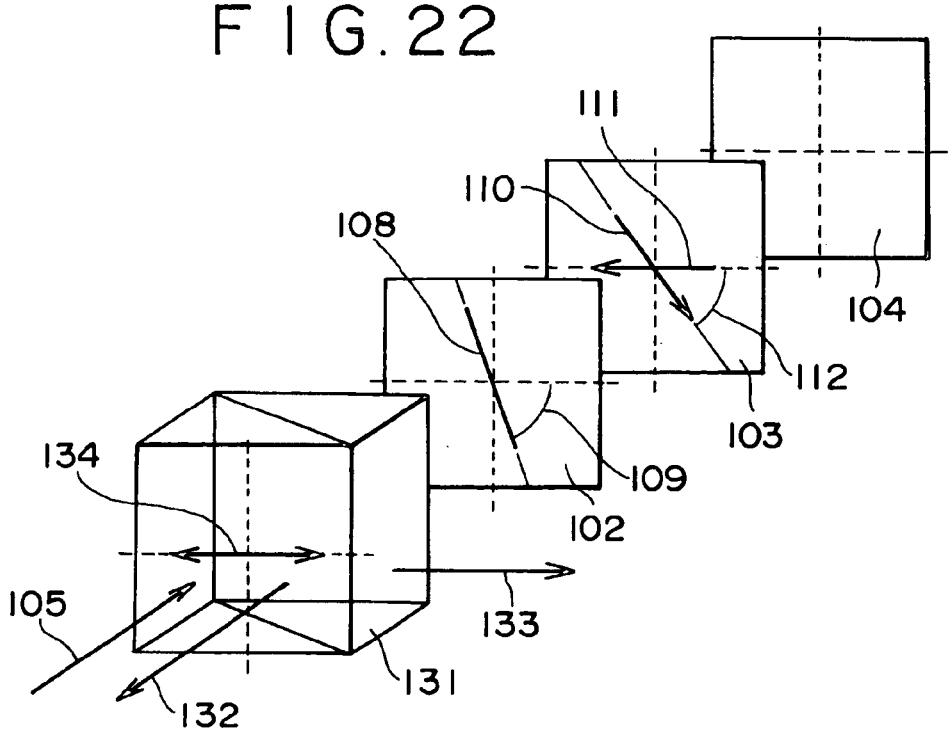
FIG. 22 is a schematic view of a third embodiment of the present invention, showing an explanatory view with regard to a relative relationship of optical axes in respective optical elements constituting a reflection-type color liquid crystal display apparatus and optical characteristics.

FIG. 22 shows a third embodiment of the present invention, showing a relative relationship of optical axes in respective optical elements constituting a reflection-type color liquid crystal display apparatus. The reflection-type color liquid crystal display apparatus to which the third embodiment is different from that of FIG. 2 in that a polarized light beam splitter 131 is used in place of the polarizing plate 101. A liquid crystal projector is named as use thereof.

In the incident light beams 105 from a light source, not illustrated, only one polarized light component 134 transmits through the polarized light beam splitter 131 and the other polarized light component is reflected by a mating plane of a prism and does not reach the phase plate 102. The polarized light component 134 is subjected to phase modulation by a phase plate 102 and a liquid crystal layer 103, the modulated light is reflected by the reflection electrode 104, the reflected light is transmitted again through the liquid crystal layer 103 and the phase plate 102 and reaches the polarized light beam splitter 131. Depending on a polarized light state at this occasion, the polarized light component 134 is transmitted through, the polarized light beam splitter 131 to form return light 132 to the light source or projected light 133 to a screen, not illustrated. Black image display is produced when almost all of light constitutes the return light 132 to the light source and white image display is produced when almost all of light constitutes the projected light 133 to the screen. Therefore, a display system of normally white is established when the parameter conditions of the phase plate 102 and the liquid crystal layer 103 are made similar to those in the second embodiment.

Figure 23:
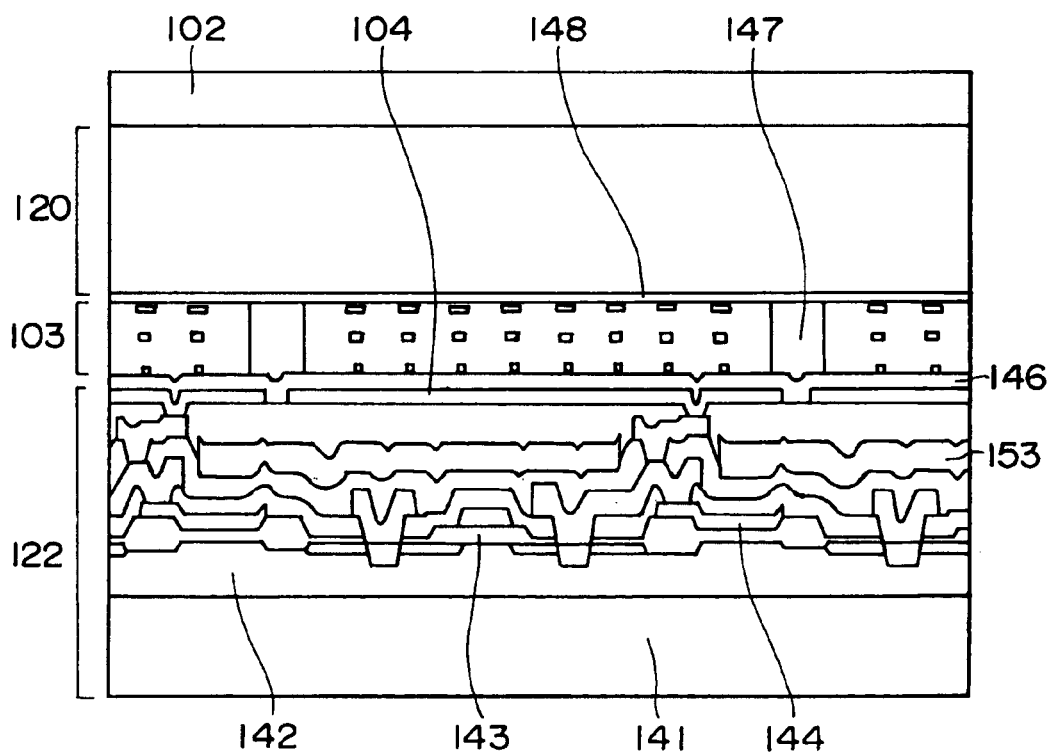
FIG. 23 is a sectional view of an embodiment of a light valve for a liquid crystal projector according to the present invention.

FIG. 23 shows a sectional view of an embodiment of a light valve for a liquid crystal projector according to the present invention. The polarized light beam splitter is omitted. According to the embodiment, a single crystal silicon substrate is used as an active matrix substrate 122. The active matrix substrate 122 comprises a p-type well 142 formed on an n-type substrate 141, an MOS (Metal Oxide Semiconductor) transistor 143 and a hold capacitor 144 formed on the p-type well 142. Wirings among respective transistors, an insulating film and the like are further laminated, and a reflection electrode 104 and a protective film 144 thereof are formed at the uppermost layer. A liquid crystal layer 103 is filled between a glass substrate 120 having a transparent electrode 148 and the active matrix substrate 122. A stay 147 is provided to maintain the thickness of the liquid crystal layer 103 constant. The light valve for the projector is exposed to high intensity light and accordingly, a light blocking layer 153 is provided so that any light does not invade the region of the MOS transistor 143. The phase plate 102 is attached on an upper surface of the glass substrate 120.

According to the embodiment, achromatic image display is made possible at all of gray scales and the liquid crystal projector having a high color reproducibility can be realized.

Other than the above-described color image display system using the color filters in parallel therewith as a system of carrying out color image display, there exists a color image display system (field sequential system) to display images of RGB (Red, Green, Blue) on a time division basis. The field sequential system is advantageous in that respective color images of RGB are displayed by a single pixel and accordingly, the number of pixels is one-third of that in the case of the color filter parallel system. Further, when an image having the same definition is displayed, the field sequential single plate system is not subjected to color shifting for each pixel in comparison with the color filter parallel system and accordingly, the image is perceived as a,highly definite image.

Also in the case of the field sequential single plate system, in order to faithfully execute color reproduction in carrying out full color display on a single panel, it is necessary that the voltage dependencies of reflectances of respective three prime colors are completed. In other words, it is necessary that the voltage dependency of chromaticity change is small.

According to a reflection type color liquid crystal display mode of the present invention, the voltage dependency of the chromaticity change is small and accordingly, it is a liquid crystal display system optimum to a liquid crystal display of the field sequential single plate system. Therefore, by applying the reflection type color liquid crystal display mode of the present invention to the reflection-type color liquid crystal display apparatus of the field sequential single plate system, the reflection-type color liquid crystal display apparatus having a high color reproducibility can be realized.

A description will be given of three embodiments of the reflection-type color liquid crystal display apparatus of the field sequential single plate system according to the present invention. Any of these embodiments have the feature. As a display system of the reflection-type color liquid crystal display apparatus, there may be used either of a system of attaching the polarizing plate on the surface of the reflection-type color liquid crystal display apparatus previously described or a system of using a polarization optical arrangement of cross Nicol using the polarized beam splitter or the like.

The reflection-type color liquid crystal display apparatus according to the embodiment is applicable to a head mount display or a surface mount display.

Figure 24:
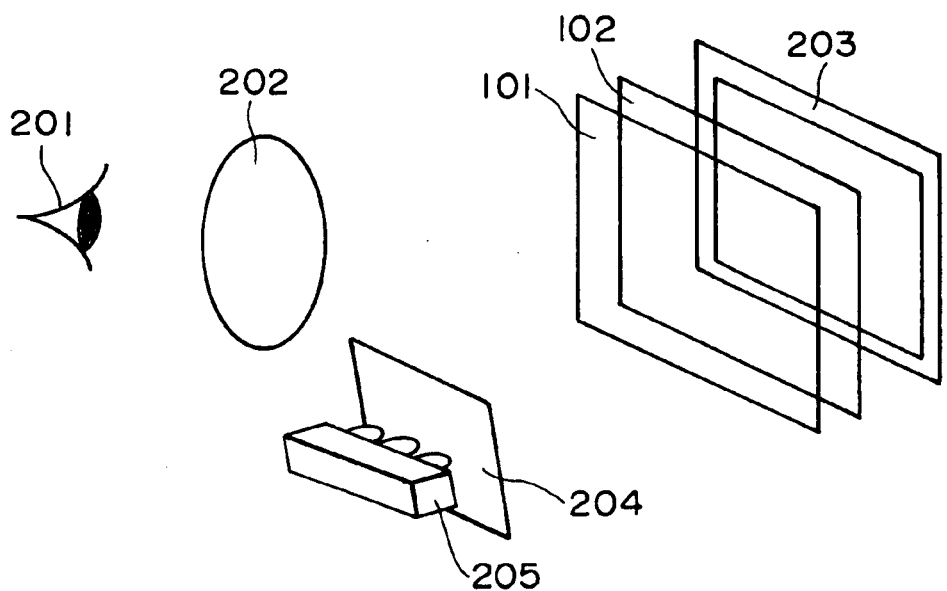
FIG. 24 shows a first embodiment of a reflection-type color liquid crystal display apparatus of a field sequential single plate type.

FIG. 24 shows a first embodiment of a reflection-type color liquid crystal display apparatus of the field sequential single plate system according to the present invention. The reflection-type color liquid crystal display apparatus according to the embodiment comprises a light source 205, a diffusing element 204, a reflection type liquid crystal panel 203 provided with the polarizing plate 101 and the phase plate 102, a lens 202 and so on.

The reflection-type color liquid crystal display apparatus according to the embodiment is a display of a system in which light from the light source 205 is diffused by the diffusing element 204, the diffused light beams are emitted on the reflection type liquid crystal panel 203 via the polarizing plate 101 and the phase plate 102, and light modulated by the reflection type liquid crystal panel 203 is viewed by an observer 201 as an image via the lens 202.

The light source 205 is constituted such that light emitting diodes in correspondence with the respective three prime colors of RGB are used and are successively lighted in synchronism with displaying of respective color images. For example, a holographic screen or a beads screen is suitable for the diffusing element 204.

Further, although according to the embodiment, three of independent light emitting diodes are combined for respective three prime colors of RGB, three light emitting diodes may be integrated in a single package.

Figure 25:
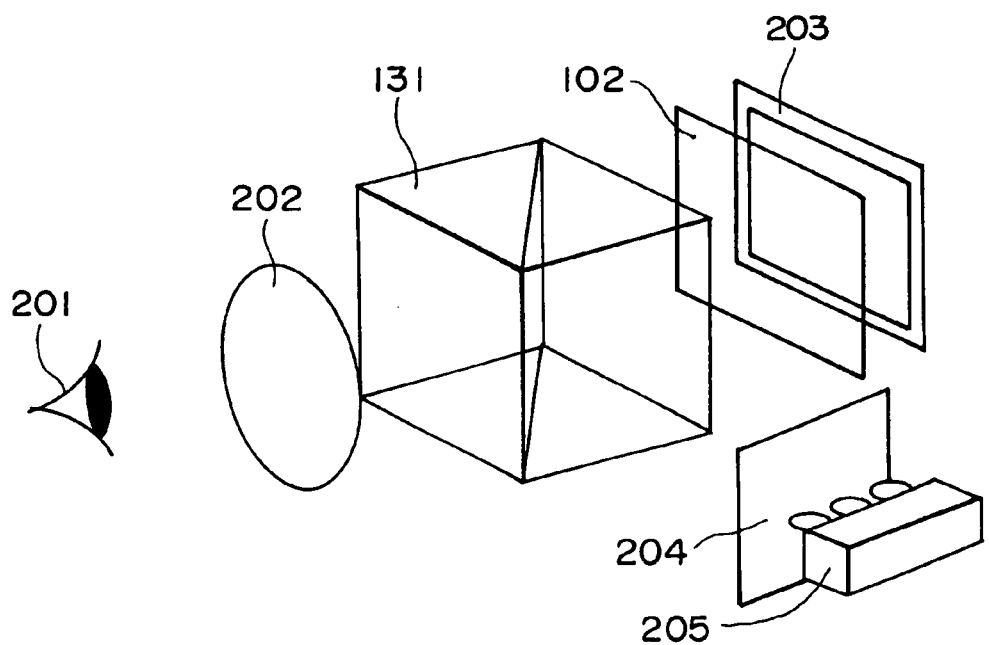
FIG. 25 shows a second embodiment of the reflection-type color liquid crystal display apparatus of the field sequential single plate type according to the present invention.

FIG. 25 shows a second embodiment of a reflection-type color liquid crystal display apparatus of the field sequential single plate system according to the present invention. A difference from the first embodiment resides in that a polarized beam splitter 131 is used in place of the polarizing plate 101. Surface reflected light of the phase plate 102 which forms unnecessary reflected light and causes the reduction of the contrast ratio in the first embodiment of the reflection-type color liquid crystal display apparatus of the field sequential single plate system, according to the embodiment, is returned in the direction of the light source 205 by the polarized beam splitter 131 and is not viewed by the observer 201, and therefore, the high contrast ratio can be realized. Further, although in the first embodiment of the reflection-type color liquid crystal display apparatus of the field sequential single plate system, surface reflected light of the polarizing plate 101 also causes the reduction of the contrast ratio, according to the embodiment, the polarized light beam splitter 131 is used in place of the polarizing plate 101 and accordingly, there is no such problem.

Figure 26:
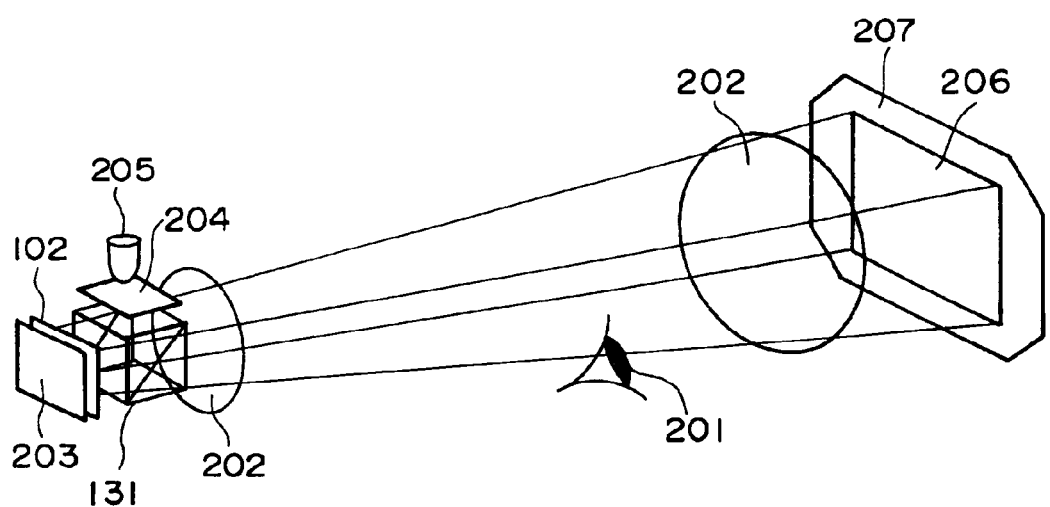
FIG. 26 shows a third embodiment of the reflection-type color liquid crystal display apparatus of the field sequential single plate type according to the present invention.

FIG. 26 shows a third embodiment of a reflection-type color liquid crystal display apparatus of the field sequential single plate system according to the present invention. According to the embodiment, light from a light source 205 using light emitting diodes is emitted on a reflection type liquid crystal panel 203 provided with a phase plate 102 via a diffusing element 204 and a polarized beam splitter 131 and light modulated by the reflection type liquid crystal panel 203 is projected onto a screen 207 via the lens 202 as an image 206. The image 206 can be viewed by the observer 201. An advantage of the third embodiment resides in that an optical system including the liquid crystal display panel can be constituted compactly.

Further, although in the embodiment, light emitting diodes are used as the light source 205, laser diodes can also be used. Light emitted from the laser diode is polarized and achieves an effect of promoting a light utilizing efficiency.

As described above, according to the present invention, by optimizing the twist angle and the retardation of the liquid crystal layer, the other three parameters of the liquid crystal orientation angle, the retardation of the phase plate and the azimuth angle of the phase plate can be calculated substantially uniquely and automatically.

Further, in addition to achromatization in white displaying and black displaying, achromatization in intermediate gray scale displaying can concurrently be realized and the color reproducibility can be enhanced.

What is claimed is:

1. A reflection-type color liquid crystal display apparatus comprising an active matrix substrate provided with a plurality of pixels each having a switching element and a reflection electrode in a matrix shape, a glass substrate having a transparent electrode a liquid crystal layer arranged between the active matrix substrate and the glass substrate, a phase plate and a polarizing plate, wherein for a normally black display system for displaying a black image on a lower voltage side of a voltage applied to the liquid crystal layer and displaying a white image at a certain voltage on a high voltage side, projections of Stokes parameter ($S_1$, $S_2$, $S_3$) of light between the phase plate and the liquid crystal layer on an $S_1$–$S_2$ plane constitute a substantially linear line and polarized light at a reflecting plane of the reflection electrode is substantially circularly polarized light in any of wavelengths, and wherein retardation of the liquid crystal layer which is a product of a thickness and refractive index anisotropy of the liquid crystal layer falls in a range equal to or larger than 200 nm and equal to or smaller than 300 nm, a twist angle of the liquid crystal layer falls in a range equal to or larger than 40 degrees and equal to or smaller than 55 degrees, an angle made by a transmission axis of the polarizing plate and a liquid crystal orientation direction on a side of the glass substrate falls in a range equal to or larger than −32 degrees and equal to or smaller than −16 degrees, an azimuth angle of the phase plate which is an angle made by the transmission axis of the polarizing plate and a retarded phase axis of the phase plate falls in a range equal to or larger than 70 degrees and equal to or smaller than 81 degrees, and retardation of the phase plate falls in a range equal to or larger than 320 nm and equal to or smaller than 430 nm.

2. The reflection-type color liquid crystal display apparatus according to claim 1, wherein retardation of the liquid crystal layer which is a product of a thickness and refractive index anisotropy of the liquid crystal layer is substantially 250 nm, a twist angle of the liquid crystal layer is substantially 50 degrees, an angle made by a transmission axis of the polarizing plate and a liquid crystal orientation direction on a side of the glass substrate is substantially −26 degrees, an azimuth angle of the phase plate which is an angle made by the transmission axis of the polarizing plate and a retarded phase axis of the phase plate is substantially 76 degrees, and retardation of the phase plate is substantially 380 nm.

3. The reflection-type color liquid crystal display apparatus according to claim 1, further comprising a light source irradiating the reflection-type color liquid crystal display apparatus with three prime colors by switching the three prime colors on a time division basis to thereby display images in correspondence with the respective three prime colors in synchronism with switching timing of the light source on the time division basis.

4. A reflection-type color liquid crystal display apparatus comprising an active matrix substrate provided with a plurality of pixels each having a switching element and a reflection electrode in a matrix shape, a glass substrate having a transparent electrode, a liquid crustal layer filled between the active matrix substrate and the glass substrate, a phase plate and a polarizing plate, wherein for a normally white display system for displaying a white image on a lower voltage side of a voltage applied to the liquid crustal layer and displaying a black image at a certain voltage on a high voltage side, projections of Stokes parameter ($S_1$, $S_2$, $S_3$) of light between the phase plate and the liquid crystal layer on an $S_1$–$S_2$ plane constitute a substantially linear line and polarized light at a reflecting plane of the reflection electrode is substantially linearly polarized light in any of wavelengths, and wherein retardation of the liquid crystal layer which is a product of a thickness and refractive index anisotropy of the liquid crystal layer is substantially 400 nm, a twist angle of the liquid crystal layer falls in a range equal to or larger than about 55 degrees and equal to or smaller than about 60 degrees, an angle made by a transmission axis of the polarizing plate and a liquid crystal orientation direction on a side of the active matrix substrate is substantially 0 degree or 90 degrees, an azimuth angle of the phase plate which is an angle made by the liquid crystal orientation direction on the side of the active matrix substrate and a retarded phase axis of the phase plate falls in a range equal to or larger than about 73 degrees and equal to or smaller than about 74 degrees, and retardation of the phase plate falls in a range equal to or larger than about 160 nm and equal to or smaller than about 200 nm.

5. The reflection-type color liquid crystal display apparatus according to claim 4, further comprising a light source irradiating the reflection-type color liquid crystal display apparatus with three prime colors by switching the three prime colors on a time division basis to thereby display images in correspondence with the respective three prime colors in synchronism with switching timing of the light source on the time division basis.

6. A reflection type liquid crystal display apparatus of a normally black display system, comprising:

a first and a second substrate;

a liquid crystal layer sandwiched between the first and second substrates;

a transparent electrode arranged on the first substrate;

a plurality of pixels each having a switching element and a reflection electrode arranged on the second substrate; and a phase plate and a polarizing plate arranged on a side of the first substrate;

wherein projections of Stokes parameter ($S_1$, $S_2$, $S_3$) of light between the phase plate and the liquid crystal layer on an $S_1$–$S_2$ plane constitute a substantially linear line, wherein polarized light at a reflecting plane of the reflection electrode is substantially circularly polarized light in any of wavelengths.

wherein retardation of the liquid crystal layer which is a product of a thickness and refractive index anisotropy of the liquid crystal layer falls in a range equal to or larger than 200 nm and equal to or smaller than 300 nm, and wherein a twist angle of the liquid crystal layer falls in a range equal to or larger than 40 degrees and equal to or smaller than 55 degrees, an angle made by a transmission axis of the polarizing plate and a liquid crystal orientation direction on a side of the first substrate falls in a range equal to or larger than −32 degrees and equal to or smaller than −16 degrees, an azimuth angle of the phase plate which is an angle made by the transmission axis of the polarizing plate and a retarded phase axis of the phase plate falls in a range equal to or larger than 70 degrees and equal to or smaller than 81 degrees, and retardation of the phase plate falls in a range equal to or larger than 320 nm and equal to or smaller than 430 nm.

7. The reflection type liquid crystal display apparatus of a normally black display system according to claim 6, wherein retardation of the liquid crystal layer which is a product of a thickness and refractive index anisotropy of the liquid crystal layer is substantially 250 nm, a twist angle of the liquid crystal layer is substantially 50 degrees, an angle made by a transmission axis of the polarizing plate and a liquid crystal orientation direction on a side of the first substrate is substantially −26 degrees, an azimuth angle of the phase plate which is an angle made by the transmission axis of the polarizing plate and a retarded phase axis of the phase plate is substantially 76 degrees, and retardation of the phase plate is substantially 380 nm.

8. The reflection-type color liquid crystal display apparatus according to claim 6, further comprising a light source irradiating the reflection-type color liquid crystal display apparatus with three prime colors by switching the three prime colors on a time division basis to thereby display images in correspondence with the respective three prime colors in synchronism with switching timing of the light source on the time division basis.

* * * * *